(12) United States Patent
Worley et al.

(10) Patent No.: US 11,008,227 B2
(45) Date of Patent: May 18, 2021

(54) WASTEWATER PURIFICATION SYSTEM

(71) Applicant: Eco Water Technologies Corp, Fort Lauderdale, FL (US)

(72) Inventors: Scott Worley, Atlantis, FL (US); Santiago Contreras, Plantation, FL (US); Paul L Culler, Tequesta, FL (US)

(73) Assignee: Eco Water Technologies Corp, Ft. Lauderdale, FL (US)

( * ) Notice: Subject to any disclaimer, the term of this patent is extended or adjusted under 35 U.S.C. 154(b) by 143 days.

(21) Appl. No.: 16/524,179

(22) Filed: Jul. 29, 2019

(65) Prior Publication Data

US 2021/0032125 A1  Feb. 4, 2021

(51) Int. Cl.
*C02F 1/24* (2006.01)
*C02F 9/02* (2006.01)
(Continued)

(52) U.S. Cl.
CPC ............... *C02F 1/24* (2013.01); *C02F 1/385* (2013.01); *C02F 1/52* (2013.01); *C02F 9/00* (2013.01); *C02F 2301/08* (2013.01)

(58) Field of Classification Search
CPC .... C02F 1/24; C02F 1/385; C02F 9/00; C02F 1/52
(Continued)

(56) References Cited

U.S. PATENT DOCUMENTS 2,446,655 A   8/1948 Lawrason
3,932,282 A   1/1976 Ettelt
(Continued)

FOREIGN PATENT DOCUMENTS

CA   2565052 A1   4/2008
CN   1302767 A    7/2001
(Continued)

OTHER PUBLICATIONS

What is a DAF?, JWC Environmental, Santa Anna, California, downloaded from the Internet from: https://www.jwce.com/knowledge-center/what-is-a-daf/ on Dec. 22, 2018.
(Continued)

*Primary Examiner* — Thomas M Lithgow
(74) *Attorney, Agent, or Firm* — Stone Creek Services LLC; Alan M Flum

(57) ABSTRACT

A wastewater purification system that uses mechanical and chemical processes to separate contaminants from municipal and other sanitary wastewater, concentrates the resulting sludge for disposal, and purifies the resulting product water for reuse as irrigation water, potable water or for disposal. The wastewater purification system can be scaled from a mobile system mounted on a skid or a tracker trailer to a large municipal wastewater treatment system. The wastewater purification system can include a hydrocyclone feeding a flotation tank. Flocculant is added upstream from the hydrocyclone after air injection by a Venturi air injector or similar device. Coagulant is added before the air injection. A dose of flocculant is added after the hydrocyclone within the vortex of the hydrocyclone and before the wastewater exits near the top of the flotation tank.

22 Claims, 13 Drawing Sheets

(51) Int. Cl.
   *C02F 1/52* (2006.01)
   *C02F 1/38* (2006.01)
   *C02F 9/00* (2006.01)

(58) Field of Classification Search
   USPC .............................. 210/221.2, 202, 205, 206
   See application file for complete search history.

(56) References Cited

U.S. PATENT DOCUMENTS

| | | | |
|---|---|---|---|
| 4,022,696 A | | 5/1977 | Krofta |
| 4,559,146 A | * | 12/1985 | Roets ........................ C02F 1/24 |
| | | | 210/705 |
| 4,624,626 A | | 11/1986 | Sherfinski et al. |
| 4,659,463 A | | 4/1987 | Chandler et al. |
| 4,885,084 A | | 12/1989 | Doyle |
| 4,931,175 A | | 6/1990 | Krofta |
| 5,021,165 A | | 6/1991 | Kalnins |
| 5,390,860 A | | 2/1995 | Ali et al. |
| 5,407,584 A | | 4/1995 | Broussard, Sr. |
| 5,460,731 A | | 10/1995 | St Pierre |
| 5,522,999 A | | 6/1996 | Broussard |
| 5,693,222 A | | 12/1997 | Galvan et al. |
| 6,126,836 A | | 10/2000 | Ding et al. |
| 6,170,978 B1 | | 1/2001 | Short |
| 6,629,686 B2 | | 10/2003 | Morse et al. |
| 6,663,782 B2 | | 12/2003 | Morse et al. |
| 6,890,431 B1 | | 5/2005 | Eades et al. |
| 8,114,283 B2 | | 2/2012 | Parkinson |
| 8,313,657 B1 | | 11/2012 | Spielman et al. |
| 8,460,549 B2 | | 6/2013 | Haney et al. |
| 8,877,065 B2 | | 11/2014 | Janjua |
| 8,945,357 B2 | | 2/2015 | Boyle et al. |
| 9,102,554 B2 | | 8/2015 | Robinson |
| 9,487,425 B1 | | 11/2016 | Culler |
| 9,512,022 B1 | | 12/2016 | Culler |
| 9,512,023 B1 | | 12/2016 | Culler |
| 9,611,162 B1 | | 4/2017 | Culler |
| 9,708,197 B2 | | 7/2017 | Anderson |
| 10,173,910 B2 | | 1/2019 | Culler |
| 2004/0074845 A1 | | 4/2004 | Hagino et al. |
| 2010/0018918 A1 | | 1/2010 | Troubounis et al. |
| 2011/0147306 A1 | | 6/2011 | Polizzotti et al. |
| 2012/0325744 A1 | | 12/2012 | Polizzotti et al. |
| 2016/0060137 A1 | | 3/2016 | Yang |
| 2017/0113952 A1 | | 4/2017 | Stephenson et al. |

FOREIGN PATENT DOCUMENTS

| | | |
|---|---|---|
| CN | 2560638 U | 7/2003 |
| CN | 102198984 A | 9/2011 |
| CN | 203820556 U | 9/2012 |
| CN | 202594823 U | 12/2012 |
| CN | 202988898 U | 6/2013 |
| CN | 102267734 B | 10/2013 |
| CN | 206027956 U | 3/2017 |
| CN | 106946378 A | 7/2017 |
| CN | 107473440 A | 12/2017 |
| EP | 972428 A | 7/1963 |
| EP | 978482 A1 | 2/2000 |
| EP | 1415697 B1 | 5/2007 |
| FR | 3048690 A1 | 9/2017 |
| GB | 2266479 A | 11/1993 |
| GB | 2282335 B | 2/1998 |
| GB | 2356860 B | 6/2004 |
| GB | 2512280 B | 6/2015 |
| JP | 2018509281 A | 4/2018 |
| KR | 100540516 B1 | 1/2006 |
| KR | 101621453 B1 | 5/2016 |
| KR | 101756970 B1 | 7/2017 |
| KR | 101899329 B1 | 9/2018 |
| WO | WO092/08533 A1 * | 5/1992 |
| WO | 200413051 A1 | 2/2004 |
| WO | 2008013189 A1 | 1/2008 |
| WO | 2009130299 A1 | 10/2009 |
| WO | 2014202847 A2 | 12/2014 |
| WO | 2017146339 A1 | 8/2017 |

OTHER PUBLICATIONS

EPA Storm Water Technology Fact Sheet Hydrodynamic Separators, EPA 832-F-99-017, Sep. 1999, United States Environmental Protection Agency, Washington, D.C.

PWL-Series DAF Systems, FRC Systems International LLC, downloaded from the Internet from: https://frcsystems.com/pwl-daf-systems/ on Dec. 22, 2018.

Nonwoo Kim, Minsoo Maeng, Gyunam Myung, Haegyun Lee, and Seok Dockko, Development of a Hybrid Treatment System for Combined Sewer Overflows Using a Hydrocyclone and a Dissolved Air Flotation System, Desalination and Water Treatment, Apr. 2016, vol. 57, (Abstract Only), Taylor and Francis Group, Abingdon, Great Britian.

M. Colic, A. Lechter, W. Morse, J. D. Miller, The Development and Application of the Hybrid Centrifugal—Dissolved Air Flotation System for Wastewater Treatment, Paper presented at American Filtration and Separation Society Meeting, Valley Forge, PA, May 2008, Clean Water Technology, Inc., Los Angeles, California.

Youngseok Hwang, Minsoo Maeng, Seok Dockko, Development of a hybrid system for advanced wastewater treatment using high-rate settling and a flotation system with ballasted media (Abstract Only), International Biodeterioration & Biodegradation. 113 (Sep. 2016): p. 256+, Academic OneFile, Downloaded from the Internet from: http://link.galegroup.com/apps/doc/A471810075/AONE?u=s9280515&sid=AONE&xid =e564b9ef on Feb. 4, 2019.

PCCS Compact DAF System, FRC Systems International LLC, Santa Ana, California, downloaded from the Internet from: https://frcsystems.com/compact-daf-system/ on Dec. 22, 2018.

Flocculators, FRC Systems International LLC, downloaded from the Internet from: https://frcsystems.com/flocculators/ on Dec. 22, 2018.

PWL-Series DAF System, FRC Systems International LLC, Dec. 2018, Santa Ana, California.

F-Series Flocculators, FRC Systems International LLC, Dec. 2018, Santa Ana, California.

PCCS Series DAF System, FRC Systems International LLC, Apr. 2015, Santa Ana, California.

Floatation Type IPF, Mar. 2017, Niijhuis Industries, Doetinchem, The Netherlands.

Floatation Type NPF, Mar. 2017, Niijhuis Industries, Doetinchem, The Netherlands.

Installation Operation and Maintenance Manual for Dissolved Air Floatation Range, Mar. 2012, Environmental Wastewater Solutions, Hampshire, England.

James K Edzwald, Dissolved air flotation and me, Water Research, vol. 44, 2010, Jan. 6, 2010, Elsevier.

Charles C Ross, Brandon M Smith, G.E. Valentine, Jr., Rethinking Dissolved Air Floation (DAF) Design for Industrial Pretreatment, 2000 WEF and Purdue University Industrial Wastes Technical Conference, May 24, 2000, Environmental Treatment Systems, Inc. Atlanta, Georgia.

The Leopold Clari-DAF PW System, Feb. 2012, Xylem, Inc. Zelienople, PA.

The Leopold Clari-DAF System Design and Optimization, Feb. 2012, Xylem, Inc. Zelienople, PA.

The Leopold Clari-DAF MP System, Feb. 2012, Xylem, Inc. Zelienople, PA.

Dissolved Air Flotation, Aquatec Maxon, downloaded from the Internet from: http://www.aquatecmaxcon.com.au/technologies/water-treatment/dissolved-air-flotation on Dec. 22, 2018.

James K Edzwald, Developments of High Rate Dissolved Air Flotation for Drinking Water Treatment, Journal of Water Supply Research and Technology-aqua, vol. 56, No. 6, Sep. 2007, IWA Publishing, London, England.

Aerofloat Brochure, Dec. 2013, Aerofloat Australia Pty, Ltd, Caringbah, Australia.

(56) References Cited

OTHER PUBLICATIONS

Model 6 Dissolved Air Flotation System, Watermark Projects, downloaded from the Internet from: https://www.watermarkprojects.co.uk/product/dissolved-air-flotation-model-6/ on Dec. 22, 2018.
DiFloat Dissolved Air Flotation (DAF), downloaded from the Internet from: http://napier-reid.com/products/difloat-dissolved-air-flotation-daf/ on Dec. 22, 2018.
Dissolved Air Flotation (Daf) Trade Waste Guideline, Sa Water. Government of South Australia, Jan. 2013, Adelaide, Australia.
Dissolved Air Flotation Circular and Rectangular Designs for Municipal and Industrial Waste Treatment, Dec. 2007, Eimco Water Technologies.
Sedicell Disolved air flotation (DAF) clarifier for sludge thickening, May 2008, KWI International Environmental Treatment GmbH, Ferlach, Austria.
Megacell V Super efficient vertical dissolved air flotation (DAF) clarifier, May 2008, KWI International Environmental Treatment GmbH, Ferlach, Austria.
Lawrence K Wang, Yng-Tse Hung, Nazih K Shammas (ed.), Handbook of Advanced Industrial and Hazardous Wastes Treatment, Jan. 2010, p. 1166, CRC Press, Taylor and Francis Group, Boca Raton, Florida.
Efficient Deep Cone Thickener, Xinhai, downloaded from the Internet from: http://www.xinhaimineral.com/en/product_9_33.html on Jul. 27, 2019.
Tilted Plate Interceptor, downloaded from the Internet from http://www.plateseparator.com/daf-flow-diagram.htm on Dec. 23, 2018.
Lawrence K Wang et al., Chemical and Biochemical Technologies for Environmental Infrastructure Sustainability, Feb. 2009 (republished Apr. 2016), 29th National Engineers Week Conference, Albany, NY, downloaded from the Internet from: https://ecommons.cornell.edu/bitstream/handle/1813/44203/2009-EngineersWeekConferenceAlbany-F.pdf on Dec. 23, 2018.
Aerofloat Dissolved Air Flotation, downloaded from the Internet from: http://www.aerofloat.com.au/dissolved-air-flotation-21 on Dec. 23, 2018.
Muffin Monster In-line/Open Channel Grinders, Mar. 2018, JWC Environmental, Santa Ana, California.
EPA Wastewater Technology Fact Sheet: Screening and Grit Removal, Sep. 2012, United States Environmental Protection Agency, Washington, D.C.
David Vletti, Laboratory Procedures Analysis for Wastewater Treatment Plant Operators, Jun. 1971, Environmental Protection Agency Waters Program—Region VII, Kansas City, Missouri.
Huber Belt Dryer BT for sewage sludge drying, Jun. 2015, Huber Technology, Inc., Huntersville, NC.
Huber Screw Press S-Press, May 2016, Huber Technology, Inc., Huntersville, NC.
Joe Wong, Clarifying Treatment: Dissolved Air Flotation Provides Alternative for Treating Raw Water with Light Particles, WaterWorld, Aug. 2, 2013, vol. 29, Issue 8, PennWell Corporation, Tulsa, Oklahoma.
Municipal Wastewater Product and Technology Offering, Mar. 2017, Evoqua Water Technologies LLC, Pittsburgh, PA.
PLC-Series DAF System, FRC Systems International LLC, Dec. 2018, Santa Ana, California.
Using DAF to Aid Municipal Wastewater Treatment Systems, FRC Systems International LLC, downloaded from the Internet from: https://frcsystems.com/municipal-wastewater-treatment-systems/ on Dec. 22, 2018.
Richard Field, David Averill, Thomas P O'Conner, and Paula Steel, Vortex Separation Technology, Water Quality Resource Journal Canada, Jan. 1997, vol. 32, No. 1, pp. 185-214, Canadian Association on Water Quality, Burlington, Ontario, Canada.

\* cited by examiner

WASTEWATER PURIFICATION SYSTEM

BACKGROUND

The present disclosure relates to systems that treat and purify wastewater, such as sanitary and municipal wastewater, into safe drinking water.

Municipal and sanitary wastewater typically is comprised of water and contaminants. The water can comprise 99.9% of the wastewater by weight, and act as a carrier for the contaminants. The contaminants can be organic or inorganic. They can include settleable, suspended, and dissolved solids in various ratios. For example, in a municipal wastewater system in southern Florida, the contaminants in the wastewater measured approximately 10 mg/L (1%) settleable solids, 205 mg/L (15%) suspended solids, and 1,140 mg/L (84%) dissolved solids. Organic solids come from microorganisms such as bacteria, viruses, and parasites, as well as decaying plant or animal byproducts. Inorganic solids include minerals, salts, and other non-organic compounds. Settleable solids refer to materials that do not remain suspended or dissolved in a settling tank. Settleable solids typically are solid particles that are larger than 1 micron and with a specific gravity greater than 2.6. Examples of settleable solids include sand, grit, and silt. Suspended solids are solid particles which remain suspended in water. They can include colloidal particles (i.e., microscopic insoluble particles dispersed in water) that are typically 1-10 micron, larger solid particles that are typically greater than 10 micron which remain suspended due to the motion or current of the water, and microorganisms that are typically 0.004-40 micron and are mostly attached to colloidal or larger solid particles with a small percentage of them free flowing. Dissolved solids refer to any organic or inorganic contaminant dissolved in water in a molecular or ionized form. Dissolved solids may include colloidal solids less than 1 micron in size. Examples of dissolved solids in municipal and sanitary wastewater include nutrients, heavy metals and dissolved organic compounds.

One of the goals of a wastewater treatment system is to separate the contaminants (i.e., the settleable, suspended, and dissolved solids) from the water sufficiently enough so that the "product water" resulting from the process can be either safely introduced back into the environment or reused. Depending on the degree of purification, the product water can be reused for irrigation or be suitable as drinking water. Another goal of wastewater treatment is to sufficiently concentrate the contaminants and neutralize the pathogens so they can be either safely disposed of or further processed for nutrient or energy recapture. The concentrated contaminants or solids are known as sludge.

Traditional biological wastewater treatment systems can include a series of treatment stages designed to separate water from contaminants, concentrate the contaminants, neutralize the pathogens, and produce product water with sufficient purity for safe disposal or reuse. A typical wastewater treatment strategy for municipalities utilizing biological processes can include the following stages: preliminary treatment, primary treatment, secondary treatment, sludge thickening, and tertiary treatment.

Preliminary treatment uses mechanical processes to remove large objects and gross particulates, such as branches, rags, and plastic, that can interfere with primary and secondary treatment. Large objects can be removed mechanically by a bar screen, followed by one or more finer screen(s). The objects can optionally be ground up by a grinder pump. Settleable solids, such as sand or grit, can be removed using centrifugal force using a grit separator.

Primary treatment can use gravity and flotation to remove some solids, typically, in a basin or settling tank. The heavier-than-water solids settle to the bottom of the tank and are scraped and drained. Lighter-than-water solids, such as fat, grease, or oil, rise to the top and can be removed by scraping over a weir or barrier. These solids are known as primary sludge.

Secondary treatment removes suspended and dissolved biodegradable matter using biological processes. This can be accomplished using aerobic, or oxygen consuming, microorganisms to consume the soluble organic contaminants and other biodegradable material releasing greenhouse gases to the environment. The biomass within the resulting activated sludge is mostly inert and has lower nutrient levels and biogas potential than primary sludge.

Sludge thickening is often done in multiple stages. The sludge can be biologically processed by either aerobic or anaerobic bacteria digestion. Sludge can be thickened mechanically by devices that can include screw thickeners, belt thickeners, or disc thickeners. The sludge can be further dewatered using a sludge filter press or a sludge-dewatering centrifuge. Other methods include sludge drying beds that dewater the sludge via evaporation and further filtration with underground drainage systems. The output of the dewatering process has approximately 15% to 35% solids to water concentration and typically is heat sterilized before disposal. The sludge can be stabilized by heating, for example, using a belt dryer. Alternatively, the sludge can be anaerobically digested to create methane.

Tertiary treatment takes the product water that results from the secondary treatment and prepares it for reuse or for release into the environment. Tertiary treatment can remove remaining biologically-based solids, metals, pharmaceuticals, and pesticides. There are a number of possible strategies for tertiary treatment. These can include media filtration, membrane filtration, ammonia and phosphate removal, and chemical disinfection.

The standard wastewater treatment processes described above pose several challenges. First, primary and secondary treatment can have slow throughput, especially during the secondary treatment stage involving biological processes. This means that the wastewater treatment facility processing large amounts of wastewater can take a significant amount of time and occupy a significant amount of space. Second, the wastewater treatment system does not scale well to small wastewater treatment systems (for example, small community wastewater treatment systems or mobile wastewater treatment systems). Third, the systems require a significant amount of infrastructure and large initial capital outlay. This can be challenging for small communities.

SUMMARY

The inventors set out to develop a wastewater purification system that attempts to overcome the challenges described in the Background section.

The inventors' wastewater purification system (hereafter, "wastewater purification system"), utilizes mechanical and chemical processes, rather than biological processes, to separate the contaminants from the wastewater, concentrate the contaminants for disposal, and produce product water that can potentially be reused as potable water. In addition, the system is scalable from a small mobile system to a large municipal system. In experimental tests results in June 2019, the inventors were able to create thickened sludge with 5.1% solids/liquid concentration directly out of a flotation tank. This represents approximately a 98% recovery rate while reducing the total suspended solids to 11 mg/L representing a 95% removal rate. With an optional filter system using ultrafiltration and nanofiltration membranes they were able to further process the product water to remove the total suspended solids below the detectable limit (100% removal rate) and to remove 88% of the total dissolved solids to 134 mg/L. This is significantly below the United States Environmental Protection Agency drinking water maximum allowable level of total dissolved solids of 500 mg/L.

The wastewater purification system can include a coagulant injector assembly, a inline air injector assembly after the coagulant injector assembly, a pre-hydrocyclone flocculant injector assembly after the inline air injector assembly, a hydrocyclone separator after the pre-hydrocyclone flocculant injector assembly, a post-hydrocyclone flocculant injector assembly after the hydrocyclone separator, and one or more outlets positioned near the waterline at the top of the flotation tank. The inventors discovered that separation efficiency could double by injecting a second dose of flocculant in the piping after the exit of the hydrocyclone separator and within the vortex developed by the hydrocyclone separator. The pre-hydrocyclone flocculant injection creates micro-floc. The post-hydrocyclone flocculant injection together with the pre-hydrocyclone flocculant injection creates macro-floc. The size of the agglomerated particles within the micro-floc is typically from 50 to 200 micron and can have a rise time of 0.0043 m/s (0.014 ft/s) in a calm vessel. The size of the agglomerated particles in the macro-floc is greater than 200 micron in length as compared with under 200 micron in length for the micro-floc. The macro-floc has an average rise rate of 0.0076 m/s (0.024 ft/s) to 0.010 m/s (0.033 ft/s), which can be more than twice the rise rate of the micro-floc. The inventors also discovered that separation efficiency increased significantly by injecting a dose of flocculant in the piping after the exit of the hydrocyclone separator and within the vortex developed by the hydrocyclone separator without first injecting a dose of flocculant before the hydrocyclone separator. After the flocculant is injected, the system can be configured to allow a rest period for the floc to develop and slow the velocity of the wastewater, before the wastewater is introduced near the top of the flotation tank. For example, larger diameter pipes, i.e., expansion pipes, extend upward within the flotation tank slowing the velocity of the wastewater. The expansion pipes include outlets positioned proximate to the waterline near the top of the flotation tank. Planar surfaces, typically in the form of planar discs, can be positioned above the expansion pipe outlets and direct the wastewater downward into the flotation tank with minimum turbulence. The inventors found that a disc shape produced more efficient results.

Unlike a dissolved air flotation system, the air can be injected by using a Venturi air injector. A Venturi air injector does not depend on other components to generate suction and introduce air into the system. Air pumps, pressurized devices, additional water sources, or control devices are not required which simplifies the system, improves reliability, and lowers costs compared to dissolved air flotation systems. Optionally, a bypass air injector assembly utilizing a bypass Venturi air injector can be positioned downstream from the inline air injector assembly to add additional air bubbles to either the micro-floc or macro-floc. Unlike the inline Venturi air injector, that is typically positioned instream, or inline, within the entire wastewater flow, these bypass air injector assemblies only use a diverted portion of the wastewater stream. The diverted wastewater is fed through the bypass Venturi air injector. The air-injected wastewater resulting from the process is then reintroduced into the wastewater stream. The inventors found that the turbulence and pressure drop in the hydrocyclone separator eliminated some of the air bubbles added by the inline Venturi air injector and broke up portions of the micro-floc. The purpose of this bypass injection of air is to only redirect a minimal portion of the wastewater stream and avoid disturbing the air-entrapped floc that has already developed. The inventors envision several configurations for the bypass air injector assembly.

For example, in one version, air is injected into a diverted portion of the micro-floc wastewater mixture produced by the pre-hydrocyclone flocculant injector assembly. This bypass air-injected stream is reintroduced after the post-hydrocyclone flocculant injection into the pipe carrying the hydrocyclone-separated wastewater. This arrangement has the advantage of injecting air-entrenched wastewater into the developing macro-floc while minimally disturbing the vortex from the hydrocyclone separator. Because the wastewater is diverted before the hydrocyclone separator, a small amount of settleable solids may bypass the hydrocyclone separator and be added into hydrocyclone-separated wastewater. The inventors developed a second version of the bypass air injector assembly that does not disturb the vortex and also does not add settleable solids to the hydrocyclone-separated wastewater. In this second version, hydrocyclone-separated wastewater is diverted after the vortex. Air is injected into this diverted stream. The resulting air-injected wastewater is reintroduced back into the pipe carrying the hydrocyclone-separated wastewater downstream, typically before the flotation tank.

The wastewater purification has the following advantages when compared to a traditional wastewater treatment system described in the Background section. First, the wastewater purification system requires a significantly smaller foot print than a conventional wastewater treatment system because it does not require large structures often associated with aerobic biological treatment of wastewater. Second, the wastewater purification system is scalable. The inventors envision that the wastewater purification system can be scaled from mobile wastewater treatment housed on a skid or within a semi tractor-trailer to large municipal wastewater treatment systems. Third, the wastewater purification system is relatively simple and requires much less initial capital outlay compared with a conventional wastewater treatment system. Fourth, the wastewater purification system can reduce greenhouse gases compared with a traditional wastewater treatment system because it does not use carbon dioxide-producing biological processes. Fifth, the inventors envision using the wastewater purification system to produce potable drinking water. This can be especially helpful in impoverished and rural communities where drinking water is scarce due to lack of resources.

This Summary introduces a selection of concepts in simplified form that are described in the Description. The Summary is not intended to identify essential features or limit the scope of the claimed subject matter.

DRAWINGS

DESCRIPTION

The terms "left," "right," "top," "bottom," "upper," "lower," "front," "back," and "side," are relative terms used throughout this Description to help the reader understand the figures. Unless otherwise indicated, these do not denote absolute direction or orientation and do not imply a particular preference. Specific dimensions, flow rates, and other specific size and performance parameters are intended to help the reader understand the scale and advantages of the disclosed material. Unless specifically included in the claims, size and performance parameters given are typical. The claimed invention is not limited to the recited size and performance parameters. The use of ordinals such as first, second, or third are used as a naming convention. They do not denote that one feature, embodiment, or structure is superior or inferior to another.

The following terms are used throughout this disclosure and are defined here for clarity and convenience.

Hydrocyclone Separator: As defined in this disclosure, a hydrocyclone separator is a cono-cylindrical shaped vessel that includes a first outlet at the vortex end of the cone (i.e., bottom of the cone) and a second outlet at the opposite end of the cone (i.e., top of the cone), with an inlet proximate to the top of the cone and tangential with the outer radius of the cone. Fluid entering the inlet forms a vortex within the vessel with heavier settleable solids forced outwards toward the wall of the hydrocyclone separator and downward, exiting out of the first outlet. The remaining fluid exits out of the second outlet.

Wastewater Stream: Throughout this disclosure, the term "wastewater stream" is used generically to describe wastewater flowing through the main flow path of the wastewater purification system 10. When referred to, the reader will be able to understand by context, where in the flow path that particular portion of wastewater being referred to is located. In some sections, there may be reference to specific portions of the wastewater stream, for example, micro-floc wastewater mixture 31 or post-hydrocyclone flocculant-dosed wastewater stream 41. These and other specific portions form a subset of the wastewater stream but can be still referred to generically as "wastewater stream."

Figure 1:
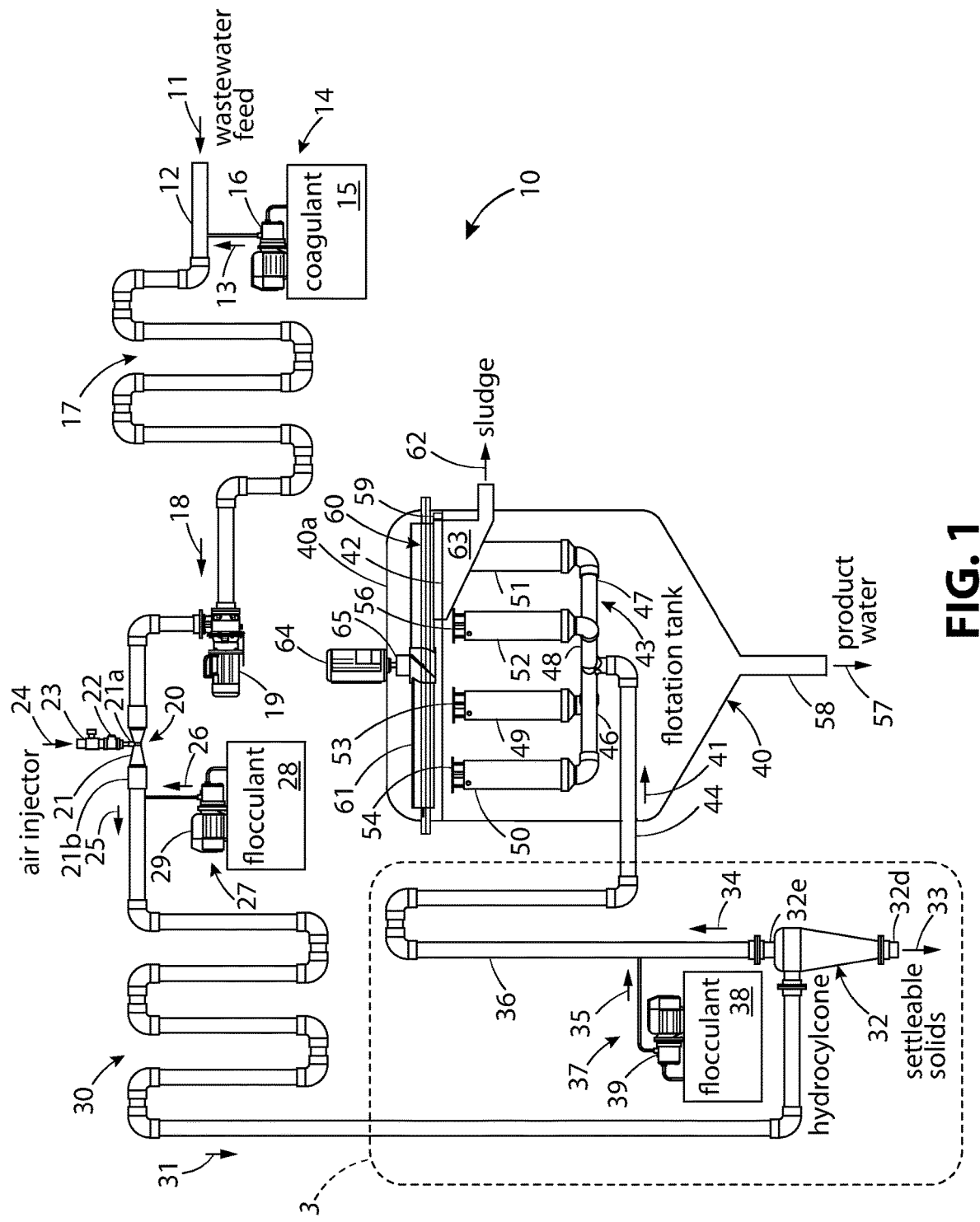
FIG. 1 illustrates a simplified block diagram of a wastewater purification system of the present disclosure.
Figure 12:
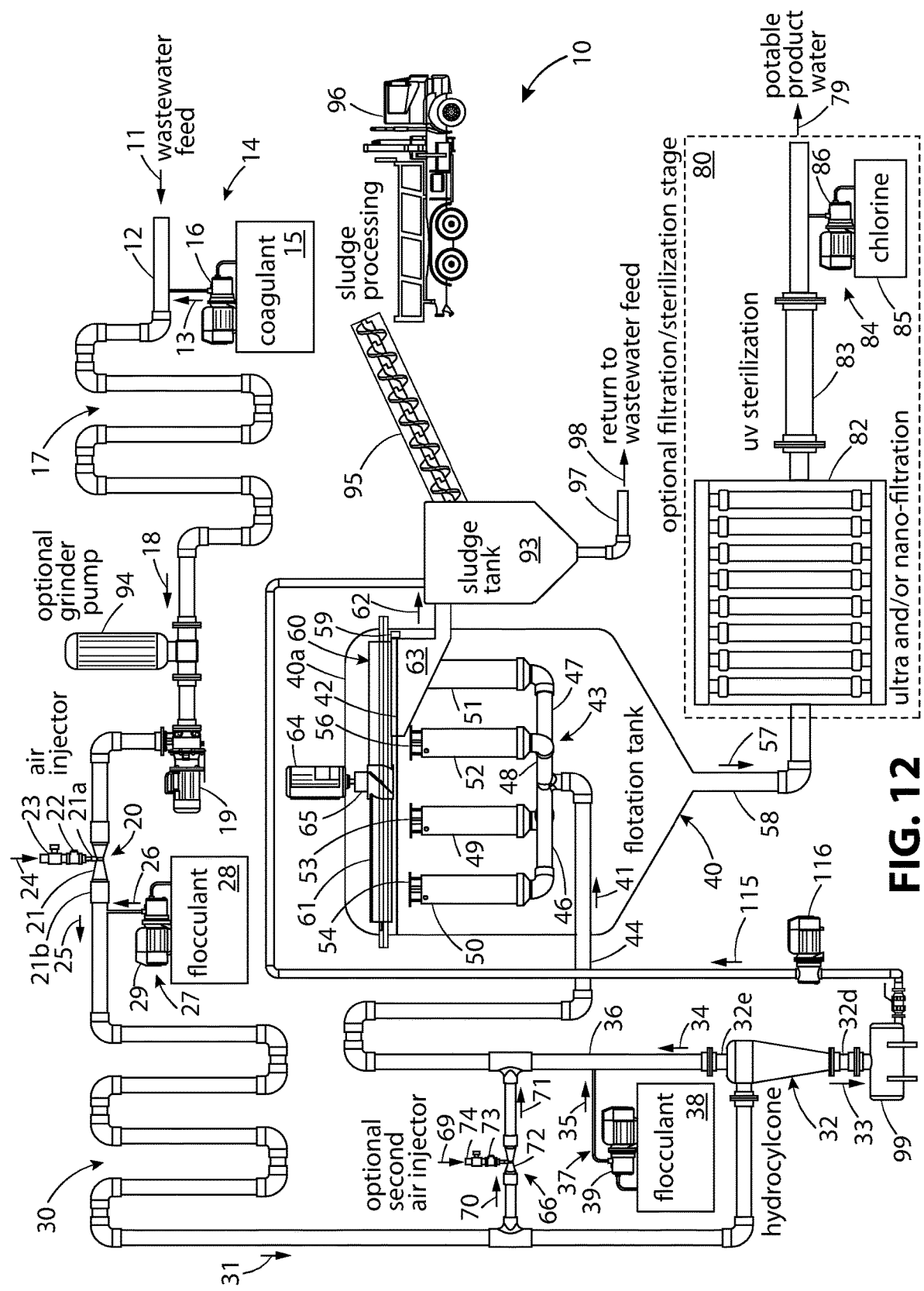
FIG. 12 illustrates a simplified block diagram of a wastewater purification system, as in FIG. 1, with additional details, and an optional filtration/sterilization stage.
Figure 13:
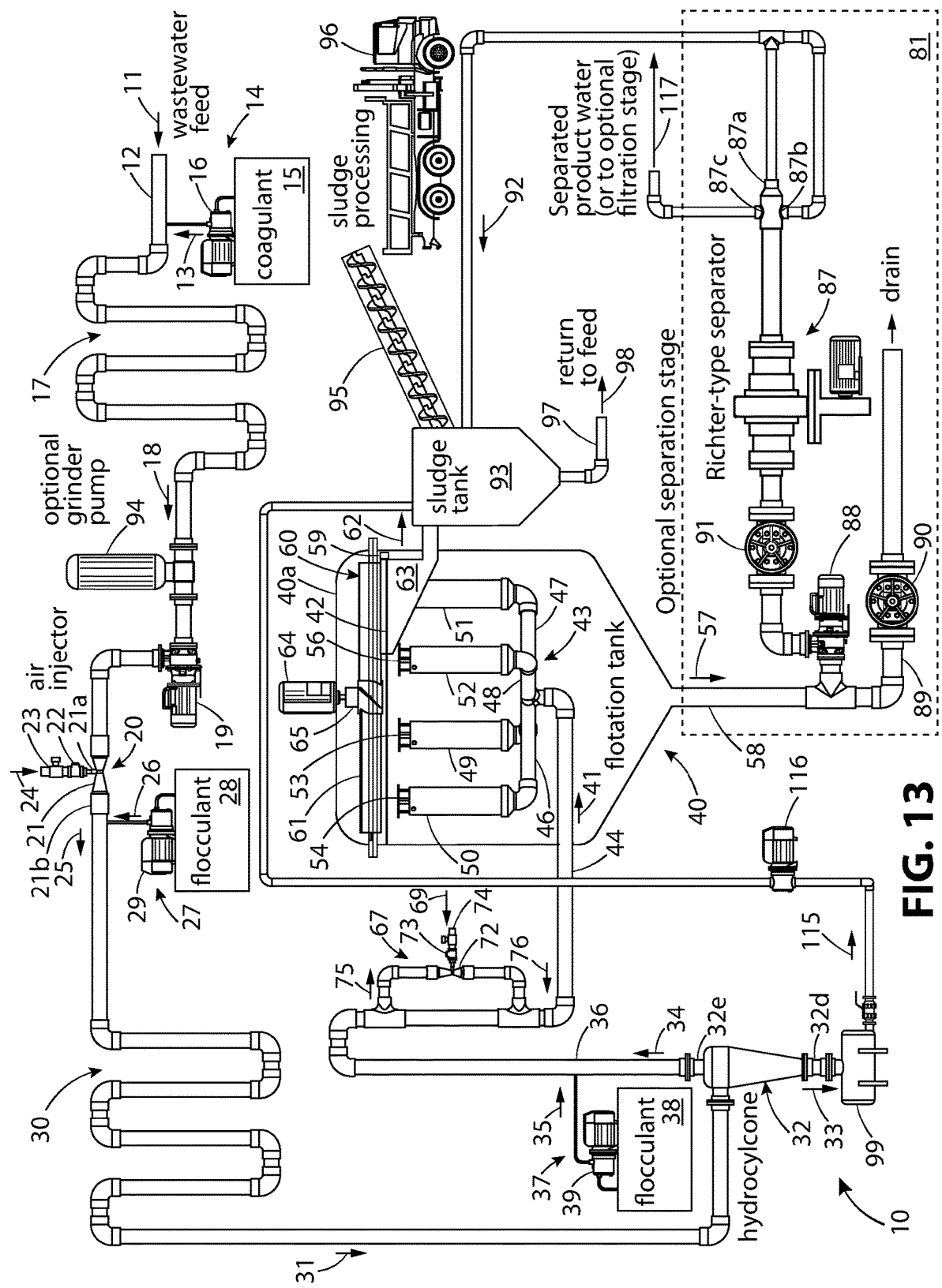
FIG. 13 illustrates a simplified block diagram of a wastewater purification system, as in FIG. 1, with additional details, and an optional separation stage.

As described in the Background section, the standard wastewater treatment process poses several challenges. Standard wastewater treatment systems, especially those that include biological processes, can have a slow throughput rate, requiring significant amounts of space for municipal wastewater treatment facilities in order to process greater throughput. Standard wastewater treatment systems often do not scale well to small community wastewater treatment systems or mobile wastewater treatment systems. Standard wastewater treatment systems often require a significant amount of infrastructure requiring a large initial capital outlay, which can be challenging for small communities. Referring to FIGS. 1, 12, and 13, the inventors set out to develop a wastewater purification system 10 that attempts to overcome the challenges described in the background section. The wastewater purification system 10 utilizes mechanical and chemical processes to separate the contaminants from the wastewater, concentrate the contaminants for disposal, and produce product water that can potentially be reused.

FIG. 1 shows a simplified block diagram of the wastewater purification system 10. FIGS. 12 and 13 illustrate simplified block diagrams of a wastewater purification system 10, as in FIG. 1, with additional optional stages, such as a filtration/sterilization stage 80 in FIG. 12 and a separation stage 81 in FIG. 13. Elements common to FIGS. 1, 12, and 13 will be described together in the following paragraphs. The filtration/sterilization stage 80 illustrated in FIG. 12 and the separation stage 81 of FIG. 13 will be described separately later in this disclosure.

Figure 2:
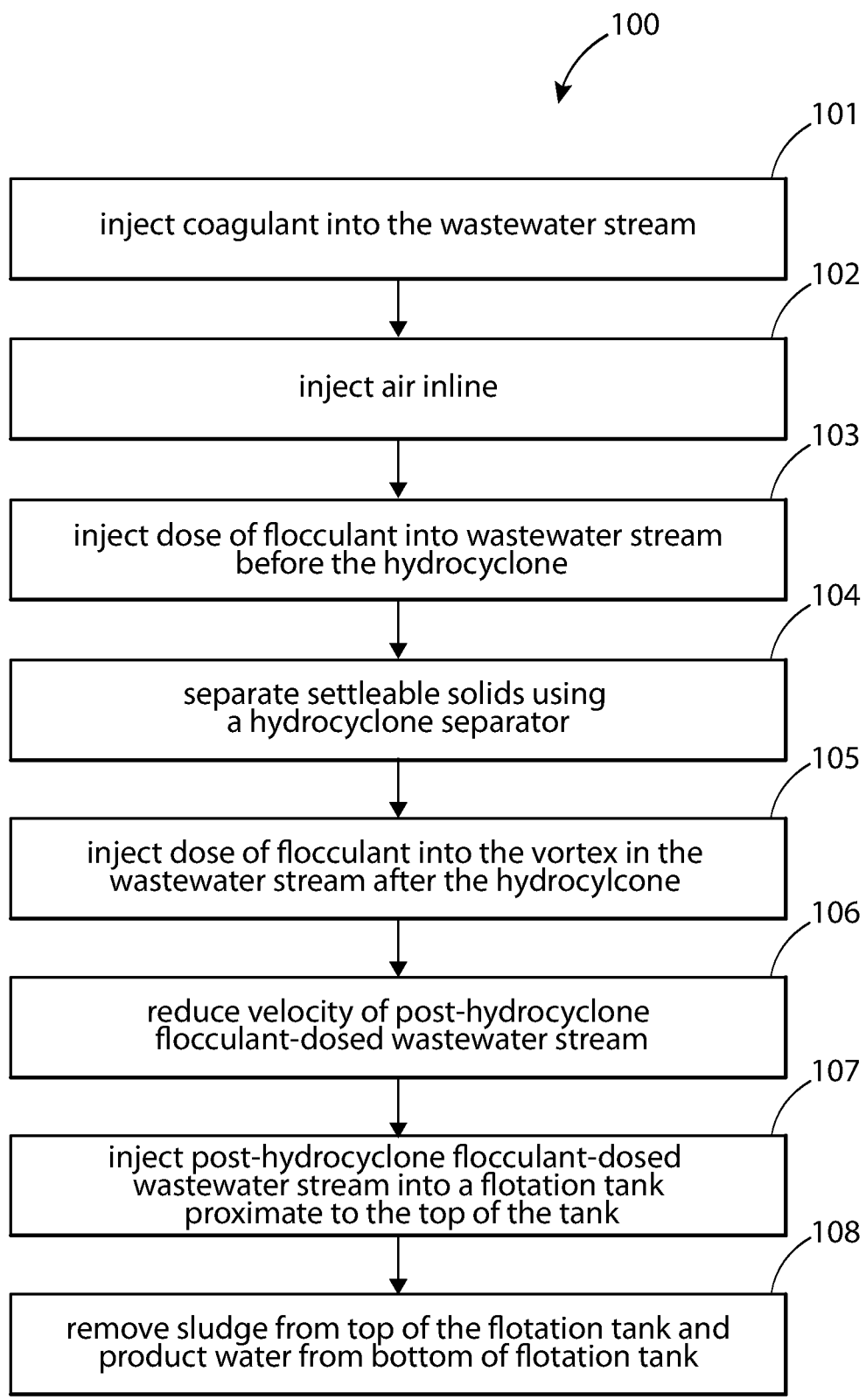
FIG. 2 illustrates a simplified process diagram illustrating a process flow of FIG. 1.

Referring to FIGS. 1, 2, 12, and 13, where FIG. 2 describes a simplified process diagram for FIG. 1 and where reference to the method 100 of FIG. 2 is shown in parenthesis, wastewater 11 feeds an inlet pipe 12. In step 101 (FIG. 2), coagulant 13 is injected into the wastewater stream by a coagulant injector assembly 14. The coagulant injector assembly 14 is illustrated as including a coagulant reservoir 15 and a continuous-dosing pump 16. The coagulant 13 is comprised of positively charged ionic particles that neutralize the negatively charged particles in the wastewater 11 and destabilizes the magnetic forces that keep them apart. Examples of coagulants include aluminum chloride hydroxide, aluminum sulfate (i.e., alum), ferric sulfate, ferrous sulfate, and ferric chloride. Dosing rates depend on the constitution of the wastewater and the throughput of the wastewater purification system 10. The amount of coagulant 13 injected into the wastewater stream and the type of coagulant used depends on several factors. This includes the type of wastewater (i.e., industrial, sanitary, municipal) and the system throughput. The type of coagulant for a specified purpose and dosing of coagulant is often recommended by coagulant manufacturers. As an example, given the specific wastewater in their experimental system, and with a throughput rate of 946 L/min (250 gal/min), the inventors found that aluminum chloride hydroxide dosed at a rate of 0.17 L/min (0.045 gal/min) can produce excellent results. The coagulant 13 and wastewater 11 can flow through serpentine piping 17. The serpentine piping 17 can be larger than the inlet pipe 12 to reduce the flow velocity of the wastewater 11. One of the purposes of the serpentine piping 17 is to increase residence time of the wastewater 11 and coagulant 13 so that they can adequately mix and the coagulant 13 has the necessary time to react with the negatively charged particles in the wastewater 11. The coagulant 13 can alternatively be mixed with the wastewater 11 using a mixing tank or by other combining structures that allow the coagulant 13 to adequately mix with the wastewater 11. The flow rate of the wastewater-coagulant mixture 18 can be regulated by a variable speed flow pump 19 or other flow regulating devices.

In step 102 (FIG. 2), air 24 is injected into the wastewater-coagulant mixture 18 by an inline air injector assembly 20. The inline air injector assembly 20 is illustrated as an inline Venturi air injector 21 and can include a check valve 22 to prevent backflow out of the air inlet 21a and a flow regulator 23 to regulate the volume of air 24 flowing into the system. The flow regulator 23 can be a fixed flow regulator or a variable flow regulator under feedback control. The pressure of the wastewater-coagulant mixture 18 increases as it flows into the inline Venturi air injector 21 because the flow becomes restricted. As the wastewater-coagulant mixture 18 exits the inline Venturi air injector 21, the flow is no longer restricted and the pressure decreases, creating a vacuum through the air inlet 21a which draws air 24 into the inline Venturi air injector 21. Because the wastewater-coagulant mixture 18 is under increased pressure, it is able to hold more air and becomes hypersaturated. The rapid decrease in water pressure causes the wastewater-coagulant mixture 18 to no longer be hypersaturated with air, releasing millions of microbubbles into the wastewater-coagulant mixture 18. These microbubbles engulf and adhere to the colloidal particles within the wastewater-coagulant mixture 18.

In step 103 (FIG. 2), the air-injected wastewater mixture 25 is injected with flocculant 26 from a pre-hydrocyclone flocculant injector assembly 27. The pre-hydrocyclone flocculant injector assembly 27, as illustrated, includes a flocculant reservoir 28, and a continuous-dosing pump 29 that injects the flocculant 26 from the flocculant reservoir 28 into the air-injected wastewater mixture 25. The type of flocculant used depends on the application. The quantity of flocculant depends in large part, on the system throughput. For municipal or sanitary wastewater treatment environments, flocculants normally used in these applications can readily be applied and in qualities known in the art. Examples of flocculants include low, medium, and high-molecular weight polymers. For example, polyacrylamide is a linear polymer used in municipal wastewater treatment. The flocculant 26 can be injected proximate to the Venturi air injector outlet 21b in order to maximize entanglement of the air bubbles with the colloidal particles as flocculant 26 causes the particles to combine into agglomerated micro-floc with the microbubbles entrapped within the micro-floc as well as microbubbles adhered to the surface of the micro-floc. The size of the agglomerated particles within the micro-floc is typically from 50 to 200 micron and can have a rise time of 0.0043 m/s (0.014 ft/s) in a calm vessel. Serpentine piping 30 can be used to increase residence time in the system. The bends in the serpentine piping 30 create turbulence. This can help mix the flocculant 26 with the air-injected wastewater mixture 25. The result is agglomerated micro-floc. The micro-floc wastewater mixture 31 can feed a hydrocyclone separator 32.

Figure 3:
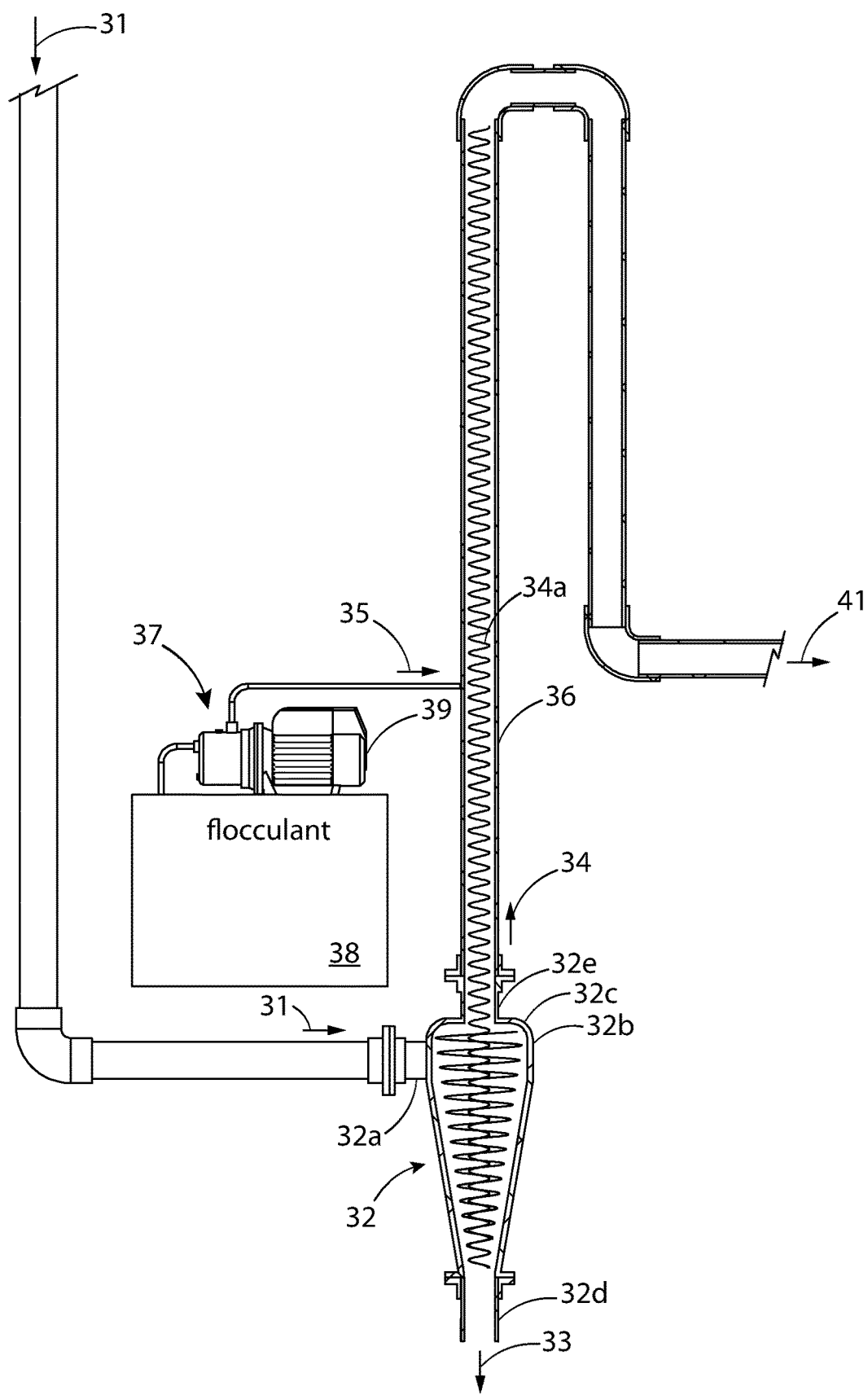
FIG. 3 illustrates a partial view of FIG. 1 illustrating a portion after the pre-hydrocyclone flocculant injector assembly and the flotation tank, enlarged for magnification purposes.

Referring to FIGS. 1-3, 12, and 13, where reference to FIG. 2 is shown in parenthesis, in step 104 (FIG. 2), the hydrocyclone separator 32 separates the settleable solids 33 from the micro-floc wastewater mixture 31. Referring to FIG. 3, the micro-floc wastewater mixture 31 enters the hydrocyclone separator 32 through an inlet 32a tangentially to the outer radius 32b of the hydrocyclone separator 32 and proximate the top 32c of the hydrocyclone separator 32. This creates a vortex within the body of the hydrocyclone separator 32. Settleable solids 33 separate from the micro-floc wastewater mixture 31 by centrifugal forces and are forced downward by gravity. Referring to FIGS. 1, 3, 12, and 13, the settleable solids 33 exit out of a first outlet 32d at the vortex of the cone of the hydrocyclone separator 32. The hydrocyclone-separated wastewater 34 that remains moves upward and exits out of the second outlet 32e.

Referring to FIGS. 1-3, 12, and 13, where reference to FIG. 2 is shown in parenthesis, in step 105 (FIG. 2), a second dose of flocculant 35 is injected in the piping 36 after the hydrocyclone separator 32 by a post-hydrocyclone flocculant injector assembly 37. The post-hydrocyclone flocculant injector assembly 37, as illustrated, includes a flocculant reservoir 38, and a continuous-dosing pump 39 that injects the flocculant 35 from the flocculant reservoir 38 into hydrocyclone-separated wastewater 34. As previously discussed, the type of flocculant used depends on the application. The quantity of flocculant depends in large part, on the system throughput.

Referring to FIG. 3, the inventors discovered that separation efficiency could be doubled by two factors. First, the separation efficiency could be increase by injecting a second dose of flocculant 35 into the piping 36 after the hydrocyclone separator 32 but within a vortex 34a developed by the hydrocyclone separator. The vortex 34a rapidly mixes the flocculant 35 with the already formed micro-floc within the hydrocyclone-separated wastewater 34 creating macro-floc. Injecting the flocculant 35 in the piping 36 after the hydrocyclone separator 32 takes advantage of the vortex 34a for mixing without undesirable effects that might occur if mixing in the hydrocyclone separator 32 itself. For example, mixing the flocculant 35 in the hydrocyclone separator 32 could cause some of the flocculant 35 to be pushed against the walls of the hydrocyclone separator 32 and eliminated as settleable solids 33 out of the first outlet 32d. Second, the separation efficiency could be increased by allowing a rest period for large agglomerated particles or macro-floc to develop before the post-hydrocyclone flocculant-dosed wastewater stream 41 is introduced proximate to the top of the flotation tank 40 of FIG. 1. As the macro-floc continues to form, it continues to collect and entrap microbubbles which increase the buoyancy agglomerated particles. The macro-floc is greater than 200 micron in length as compared with under 200 micron in length for the micro-floc. The macro-floc has an average rise rate of 0.0076 m/s (0.025 ft/s) to 0.010 m/s (0.033 ft/s), which can be more than twice the rise rate of the micro-floc. In experimental tests results in June 2019, the inventors were able to create thickened sludge 62 with 5.1% solids/liquid concentration. This represents approximately a 98% recovery rate.

Figure 4:
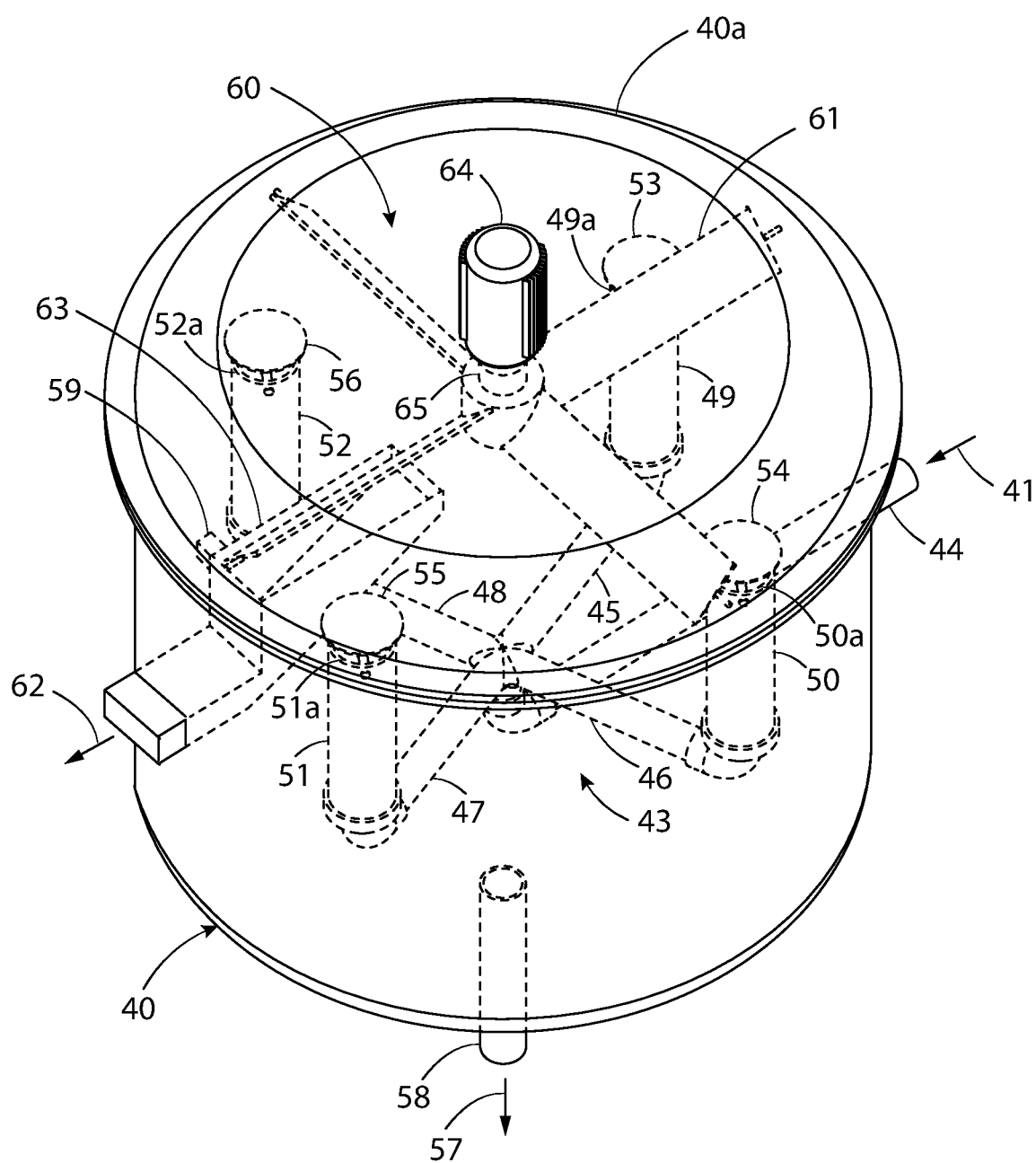
FIG. 4 illustrates a portion of FIG. 1, in rear perspective view, showing the flotation tank, with hidden portions of the interior of the flotation tank illustrated by dashed lines.
Figure 5:
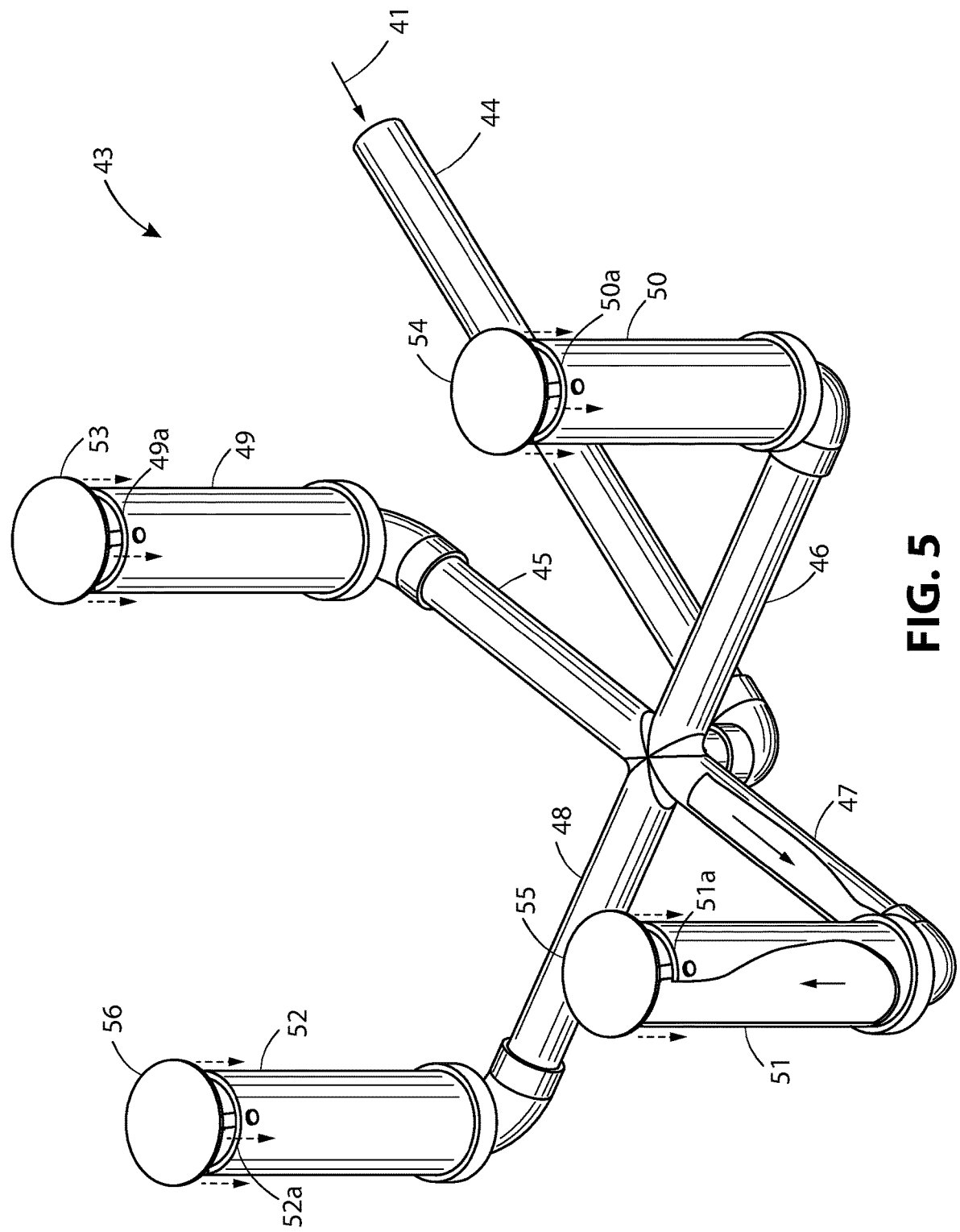
FIG. 5 illustrates, in rear perspective view, the wastewater inlet assembly within the flotation tank, with portions cutaway for clarity.

Referring to FIGS. 1, 2, 4, 5, 12, and 13, where reference to FIG. 2 is shown in parenthesis, in step 106 (FIG. 2), the velocity of the post-hydrocyclone flocculant-dosed wastewater stream 41 is reduced. In step 107 (FIG. 2) the post-hydrocyclone flocculant-dosed wastewater stream 41 enters the flotation tank inlet assembly 43 and is injected into the flotation tank 40 (FIGS. 1, 4, 12, and 13) proximate to the waterline 42 (FIGS. 1, 12, and 13). For clarity, FIG. 4 illustrates a portion of FIG. 1, in rear perspective view, showing the flotation tank 40, with hidden portions of the interior of the flotation tank 40 illustrated by dashed lines. FIG. 5 illustrates, in rear perspective view, the wastewater inlet assembly within the flotation tank 40 of FIGS. 1, 4, 12, and 13, with a portion cutaway for clarity. Referring to FIGS. 1, 2, 4, 5, 12, and 13, the flotation tank inlet assembly 43, as illustrated, includes a flotation tank inlet pipe 44 and optionally includes the lateral distribution pipes 45, 46, 47, 48 which divide the wastewater stream into multiple paths. The lateral distribution pipes 45, 46, 47, 48 can be horizontal, as illustrated or angled upward or downward depending on the configuration of the flotation tank 40. The lateral distribution pipes 45, 46, 47, 48 feed the expansion pipes 49, 50, 51, 52, respectively, with the lateral distribution pipe 45 hidden from view in FIGS. 1, 12, and 13. The expansion pipes 49, 50, 51, 52 are significantly wider in diameter than the lateral distribution pipes 45, 46, 47, 48, or the flotation tank inlet pipe 44 to slow down the velocity of the post-hydrocyclone flocculant-dosed wastewater stream 41. For example, for a flotation tank inlet pipe 44 of 0.0762 m (3.0 in) in diameter, and four expansion pipes 49, 50, 51, 52 of 0.102 m (4.0 in) in diameter, and a flow rate of 946 L/min (250 gal/min), the velocity would reduce from 3.5 m/s (11.4 ft/s) through the flotation tank inlet pipe 44, to 0.49 m/s (1.6 ft/s) through the expansion pipes 49, 50, 51, 52. This represents an 86% reduction in velocity. If the expansion pipes 49, 50, 51, 52 were expanded to 0.152 m (6.0 in) in diameter, the velocity could be reduced to 0.22 m/s (0.71 ft/s). This represents a 94% reduction in velocity. The aim is to minimize turbulence within the flotation tank 40 of FIG. 4. Planar surfaces 53, 54, 55, 56, illustrated as planar discs, are suspended above the expansion pipe outlets 49a, 50a, 51a, 52a, respectively. Each of the expansion pipe outlet 49a, 50a, 51a, 52a is shown in FIGS. 4 and 5, with planar surface 55 being hidden from view in FIG. 1. The planar surfaces 53, 54, 55, 56 deflect the post-hydrocyclone flocculant-dosed wastewater stream 41 downward and further reduce the velocity by spreading the flow of the post-hydrocyclone flocculant-dosed wastewater stream 41. While four paths are illustrated for the lateral distribution pipes 45, 46, 47, 48, expansion pipes 49, 50, 51, 52, and planar surfaces 53, 54, 55, 56, the number of paths can vary depending on the size of the flotation tank and the system throughput. For example, for a small mobile system, less than four of the lateral distribution pipes 45, 46, 47, 48, expansion pipes 49, 50, 51, 52, and planar surfaces 53, 54, 55, 56 can be used. For example, and as few as one lateral distribution pipe, expansion pipe, and planar surface, such as lateral distribution pipe 46, expansion pipe 49, and planar surface 53 may be adequate. A large flotation tank used in a municipal wastewater treatment system may require more than four of the lateral distribution pipes 45, 46, 47, 48, expansion pipes 49, 50, 51, 52, and planar surfaces 53, 54, 55, 56.

Referring to FIGS. 1, 2, 4, 12, and 13, with reference to FIG. 2 shown in parenthesis, in step 108 (FIG. 2), the thickened sludge 62 is removed from the top of the flotation tank 40 and the product water 57 is removed from the bottom of the flotation tank 40. The flotation tank 40 is sized and shaped to optimize the rise rate of the agglomerated particles with the fall rate of the product water 57. This allows agglomerated particles from the post-hydrocyclone flocculant-dosed wastewater stream 41 to separate and rise above the top of the waterline 42 of FIGS. 1, 12, and 13. The product water 57, that is essentially free of agglomerated particles, exits from the product water outlet 58 at the bottom of the flotation tank 40. The inflow rate of post-hydrocyclone flocculant-dosed wastewater stream 41 through the flotation tank inlet pipe 44, is optimized at a nearly constant rate in order to maximize separation, minimize turbulence in the tank, and keep the waterline 42 nearly constant. The flow rate can be periodically adjusted using a computer, microcontroller, or feedback control unit, via a liquid level sensor 59, that can be mounted proximate to the waterline 42 as illustrated. Alternatively, other liquid level sensors can be used, for example, a pressure switch that measures the pressure differential of the water in the tank between the location of the pressure switch and the water line. The agglomerated particles float to the top of the flotation tank 40. As the agglomerated particles concentrate above the water line, the air dissipates and a blanket of thickened sludge builds up and floats on the top of the water. A skimmer assembly 60 pushes the thickened sludge 62 into an exit trough 63. The exit trough 63 can be positioned above the waterline 42 to prevent the sludge from being diluted. The skimmer assembly 60 is illustrated by a circular skimmer 61 driven by a motor 64 attached to a shaft 65 positioned at the center of rotation of the circular skimmer 61. The flotation tank 40 can include a cover 40a with a vent to accommodate the removal of the air that dissipates as the sludge blanket thickens. The motor 64 can be mounted to the outside of the cover 40a, simplifying the design of a skimmer assembly 60. Having a covered non-biological system can help to reduce odor. This can be particularly useful in mobile wastewater, urban, or suburban wastewater treatment where odor can affect residents. While a circular skimmer 61 can be useful and has the advantages discussed above, a linear skimmer can be used in certain applications. Alternatively, a pump can be used to remove the sludge from the flotation tank where the sludge solids to water ratio is not critical to the application and a less concentrated sludge is suitable.

Referring to FIG. 4, the flotation tank 40 is illustrated as cylindrical. Referring to FIGS. 1, 12, and 13, a conical portion extending from the bottom of the cylinder. The inventors found that this structure had several advantages. The cylindrical shape reduced eddy currents and turbulence and allowed for the addition of a simple skimming structure, such as the circular skimmer 61 illustrated. The conical portion extending from the bottom of the cylinder allowed efficient drainage of the product water 57.

Figure 6:
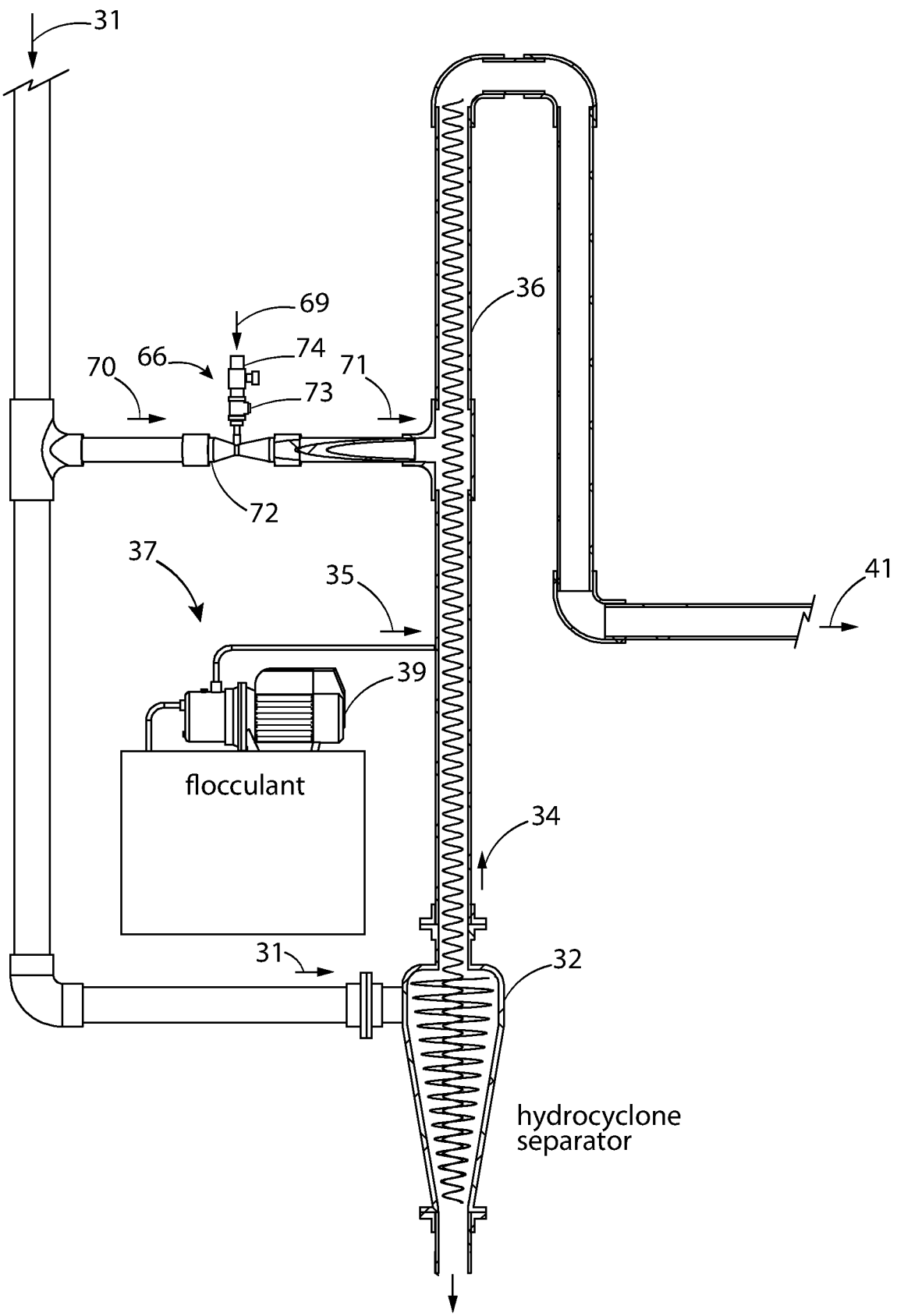
FIG. 6 illustrates a partial view of FIG. 1 illustrating a portion between the pre-hydrocyclone flocculant injection and the flotation tank with a first version of an optional bypass air injector assembly, enlarged for magnification purposes.
Figure 8:
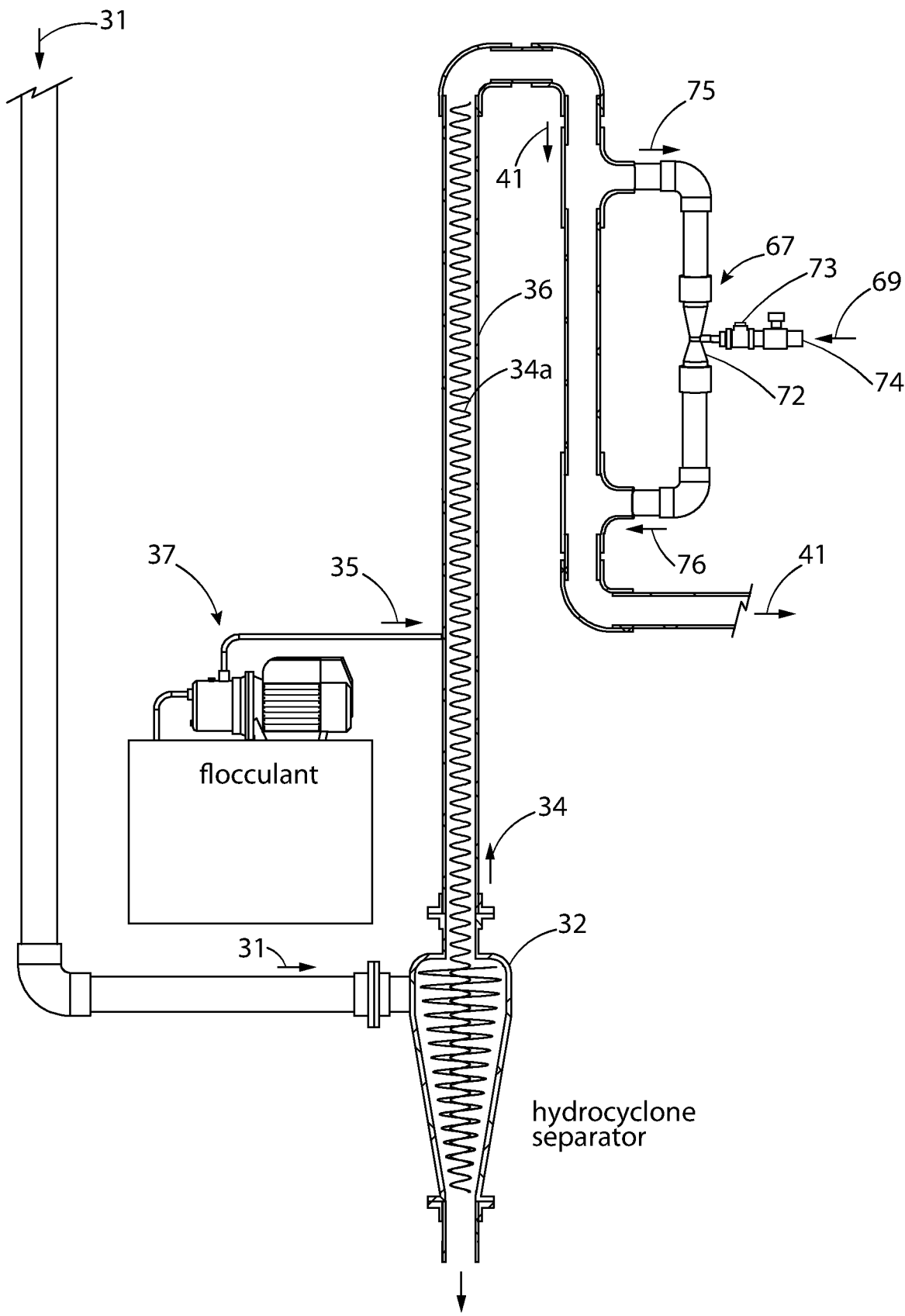
FIG. 8 illustrates a partial view of FIG. 1 illustrating a portion between the pre-hydrocyclone flocculant injection and the flotation tank with a second version of an optional bypass air injector assembly, enlarged for magnification purposes.
Figure 10:
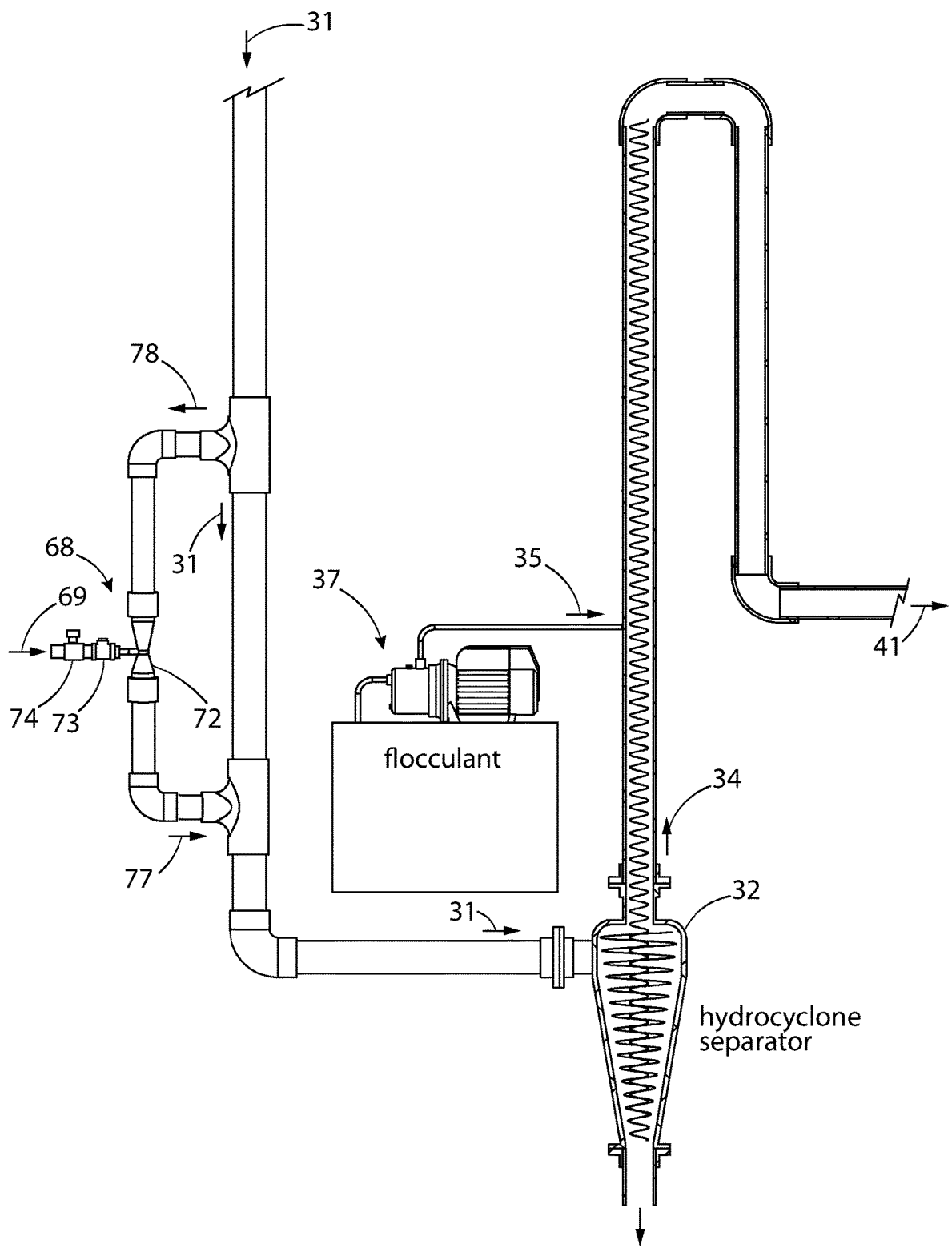
FIG. 10 illustrates a partial view of FIG. 1 illustrating a portion between the pre-hydrocyclone flocculant injection and the flotation tank with a third version of an optional bypass air injector assembly, enlarged for magnification purposes.

Venturi air injectors, such as the inline Venturi air injector 21 of FIGS. 1, 12, and 13 or the bypass Venturi air injector 72 of FIGS. 6, 8, and 10, do not depend on other components to generate suction and introduce air into the system. Air pumps, pressurized devices, additional water sources, or control devices are not required, which simplifies the system, improves reliability, and lowers costs. Dissolved air flotation devices (DAFs) are typically used to treat industrial wastewater. While the wastewater purification system 10 appears to share some similarities with DAFs, there are important differences. DAFs typically use external air pumps to introduce air into the system while the wastewater purification system 10 can use a Venturi air injector that is internal to the system and relies on its the geometry alone, with no moving parts, to change the pressure and generate suction of air into the system. The lack of moving parts increases the reliability and decreases the probability of failure of the air injection system while decreasing the energy demand to run the system. DAFs typically require a separate pressurized system, usually a type of pressure vessel, to increase the pressure and dissolve the air pumped into the system before depressurizing the water to release air bubbles into or immediately before a flotation tank. The Venturi air injector of the wastewater purification system 10 introduces air into the system, pressurizes it, and depressurizes it, all in one device, eliminating the need for an air pump and a pressurized system. DAFs also typically require separate water sources independent of the wastewater stream for this dissolved air process since these pressurized systems can be complex and wastewater may damage components within these systems. In addition to these complex devices, these air pumps, pressurized systems, and separate water sources require controls needed to run the system. These elaborate dissolved air systems typically require more frequent, more labor intensive, and more costly maintenance and repairs than a simple static device like a Venturi air injector. Due to the complexity of the dissolved air systems in DAFs, they typically only have one dissolved air location, compared to the flexibility of the wastewater purification system 10 where Venturi air injector assemblies can be easily moved to different locations within the system or have multiple air injection locations. This flexibility also facilitates the strategic placement of air injectors to promote the generation of micro-floc and, subsequently, macro-floc which is critical to increasing the rise rate and creating a more efficient system. The microbubbles released as the result of the Venturi air injector are mixed with the flocculant and suspended solids as the floc is forming. This causes the air bubbles to be encapsulated within the inside of the floc as well as adhering to the outside. The process can be enhanced by placing the flocculant injector assembly in close proximity to the air injector assembly. These distinct differences allow the wastewater purification system 10 to have an increased efficiency compared to DAF systems allowing for the possibility of a smaller flotation tank than a DAF system for a given throughput. The improved floc size with the higher concentrations of air bubbles and the lack of an air pump, a pressurized vessel, a separate water source, and control devices allows for the use of less parts in a simplified, more reliable, and more efficient system.

Figure 7:
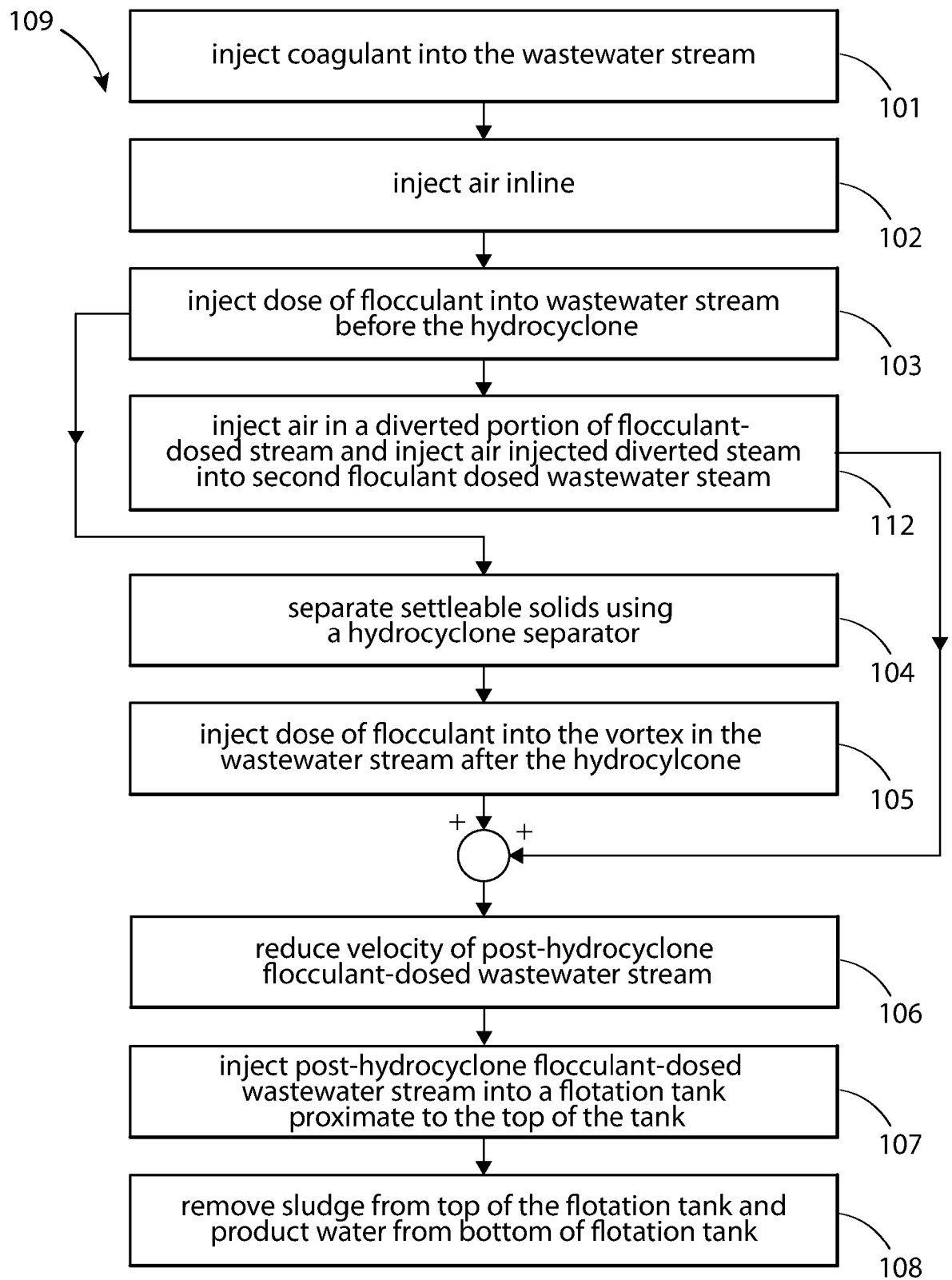
FIG. 7 illustrates a simplified process diagram showing a process flow of FIG. 1 using the first version of the optional bypass air injector assembly illustrated in FIG. 6.
Figure 9:
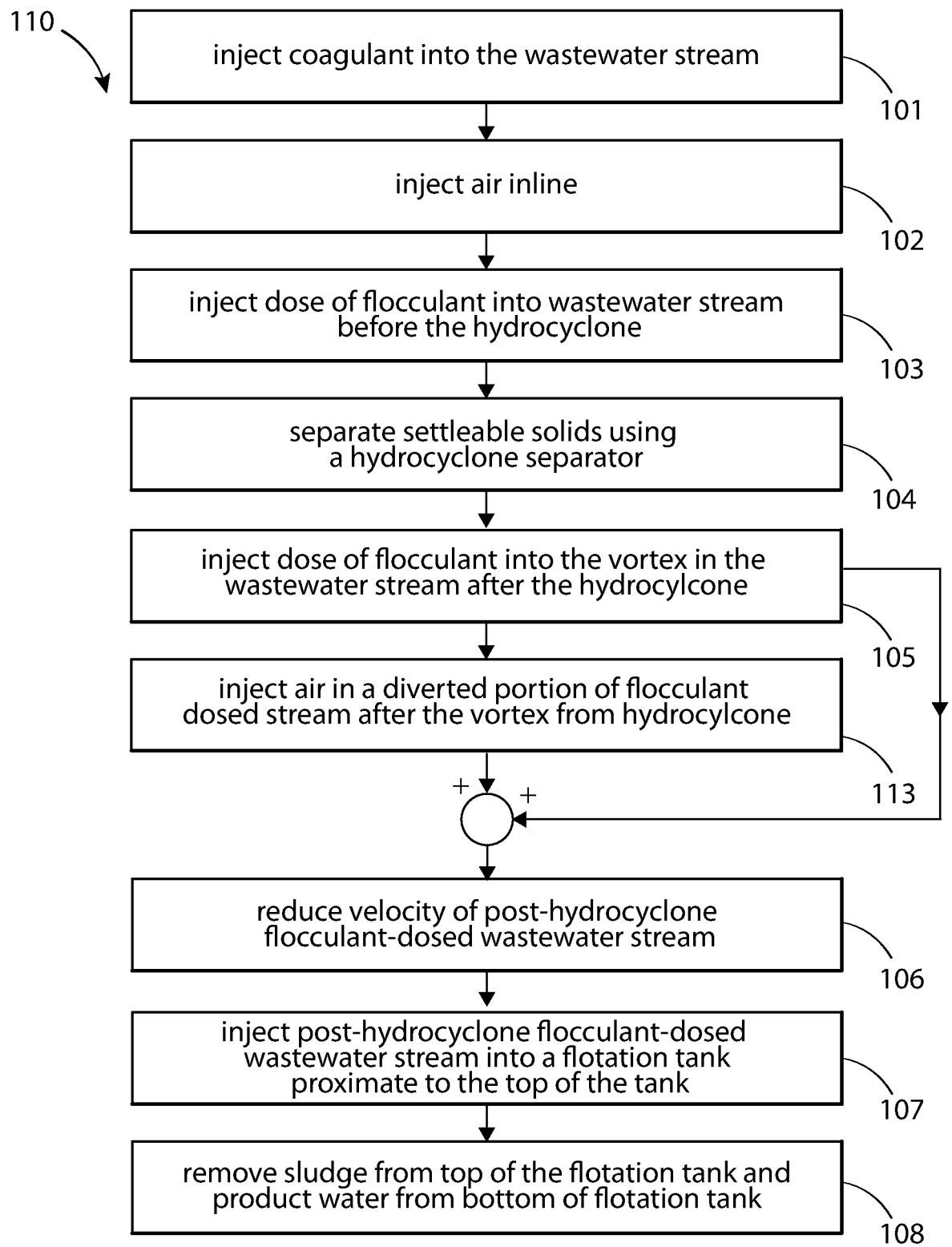
FIG. 9 illustrates a simplified process diagram showing a process flow of FIG. 1 using the second version of the optional bypass air injector assembly illustrated in FIG. 8.
Figure 11:
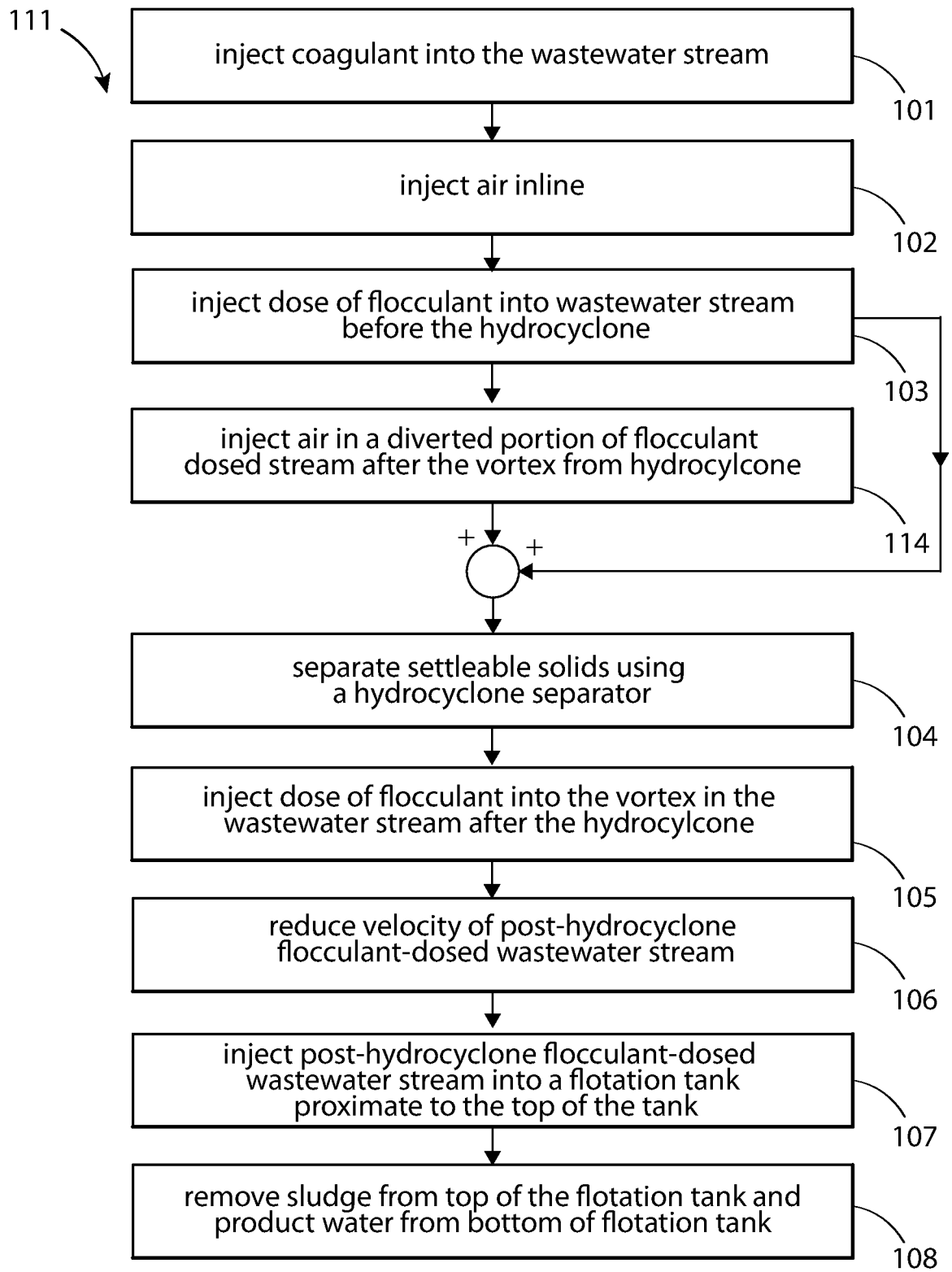
FIG. 11 illustrates a simplified process diagram showing a process flow of FIG. 1 using the third version of the optional bypass air injector assembly illustrated in FIG. 10.

The wastewater purification system 10 can optionally include a bypass air injector assembly. The purpose of the bypass air injector assembly is to provide additional microbubbles for the macro-floc formation after the post-hydrocyclone flocculant injection. Three alternative versions of the optional bypass air injector assemblies are illustrated as examples. The first version of the bypass air injector assembly 66 is illustrated in FIG. 6 and is applied as an example to FIG. 12. A second version of the bypass air injector assembly 67 is illustrated in FIG. 8 and is applied as an example to FIG. 13. A third version of the bypass air injector assembly 68 is illustrated in FIG. 10. FIGS. 7, 9, and 11 illustrate process flow charts of FIG. 1. The method 109 of FIG. 7 utilizes the bypass air injector assembly 66 of FIG. 6. The method 110 of FIG. 9 utilizes the bypass air injector assembly of FIG. 8. The method 111 of FIG. 11 utilizes the third version of the bypass air injector assembly 68 of FIG. 10. The methods 109, 110, 111 of FIGS. 7, 9, and 11, respectively, all share the steps 101, 102, 103, 104, 105, 106, 107, 108 with the method 100 of FIG. 2. These steps can be carried out as described in FIG. 2 and can utilize the structural and functional combinations described in FIGS. 1, 3, 4, 5, 12, and 13. For brevity, only the differences will be described in the following discussion for FIGS. 6-11.

In FIGS. 6, 8, and 10 rather than injecting air directly into the wastewater stream, a small portion of the wastewater stream is diverted, air is injected in the diverted portion, and then feeds the air-injected stream back into the wastewater stream. For example, 10% of the wastewater stream, by volume, can be diverted and injected back into the wastewater stream. For a wastewater stream flowing through a 0.0762 m (3.0 in) diameter pipe, the size of the diversion pipe could be 0.0254 m (1.0 in). Bypass air injector assemblies 66, 67, 68, of FIGS. 6, 8, and 10, respectively, illustrate examples of different positions for diverting wastewater and reintroducing the resultant air-injected wastewater. Injecting air into a diverted portion of the wastewater stream rather than the entire wastewater stream can potentially help prevent the floc from breaking up. Air-entrapped floc is lighter in weight than non-air-entrapped floc and therefore can float to the top of the flotation tank 40 of FIG. 1 more efficiently.

Referring to FIGS. 6, 7, and 12 where reference to FIG. 7 is shown in parenthesis, in step 112, air 69 is injected into a diverted portion 70 of the micro-floc wastewater mixture 31. This bypass air-injected stream 71 is injected into the piping 36 carrying the hydrocyclone-separated wastewater 34 after the flocculant 35 has been injected into hydrocyclone-separated wastewater 34 by the post-hydrocyclone flocculant injector assembly 37. The bypass air injector assembly 66 can include a bypass Venturi air injector 72 and optionally a check valve 73 and flow regulator 74. The check valve 73 and flow regulator 74 can function similarly to the check valve 22 and flow regulator 23 of FIG. 1. This arrangement has the advantage of injecting air-entrenched wastewater into developing macro-floc while minimally disturbing the vortex developed by the hydrocyclone separator 32.

While the bypass air injector assembly 66 has the above described advantage, it has the disadvantage of letting through some settleable solids. This is because it injects a small portion of the micro-floc wastewater mixture 31, which includes small amounts of settleable solids, into the hydrocyclone-separated wastewater 34. Some of these settleable solids come out in the sludge from the flotation tank and the small remaining quantity of settleable solids is easily removed during the optional filtration process without effecting the operating efficiency of the filters. Referring to FIG. 8, the second version of the bypass air injector assembly 67 does not disturb the vortex in the piping 36 developed by the hydrocyclone separator 32 and does not add settleable solids to the post-hydrocyclone flocculant-dosed wastewater stream 41. Referring to FIGS. 8, 9, and 13, where reference to FIG. 9 is shown in parenthesis, in step 113 (FIG. 9) the air 69 is injected into a diverted portion 75 of the hydrocyclone-separated wastewater 34. The diverted portion 75 is diverted after the vortex 34a (FIG. 8). This bypass air-injected stream 76 is injected back into the piping 36 downstream and typically before the flotation tank. The bypass air injector assembly 67 can include a bypass Venturi air injector 72, and optionally, a check valve 73 and flow regulator 74 that can be structured and function as previously described. By diverting a small portion of the post-hydrocyclone flocculant-dosed wastewater stream 41 after the vortex has dissipated, and reinjecting downstream, the developing macro-floc gains additional air entrenchment. At the same time, the macro-floc is minimally broken up as compared to inline air injection.

It may also be desirable to inject air in a similar manner as described for FIGS. 8 and 9 but in the micro-floc wastewater mixture 31 before the hydrocyclone separator 32. Referring to FIGS. 10 and 11, where reference to FIG.

11 is shown in parenthesis, in step 114 (FIG. 11), a small portion of the micro-floc wastewater mixture 31 is diverted, air 69 is injected and the bypass air-injected stream 77 is reintroduced downstream from the point of diversion but before the hydrocyclone separator 32. Referring to FIG. 10, the bypass air injector assembly 68 is structured similarly to the bypass air injector assembly 67 of FIG. 8. A diverted portion 78 of the micro-floc wastewater mixture 31 can be mixed with air 69 by a bypass Venturi air injector 72. The bypass Venturi air injector 72 can optionally be fed by a check valve 73 and a flow regulator 74 and can function and be structured as previously described. The bypass air-injected stream 77 forms after the bypass Venturi air injector 72 is reintroduced into the micro-floc wastewater mixture 31 before the hydrocyclone separator 32. One of the purposes of this system is to reintroduce entrenched air into the micro-floc before the hydrocyclone separator 32. The flocculant 35 is injected by the post-hydrocyclone flocculant injector assembly 37 into the vortex formed in the piping 36 by the hydrocyclone separator 32, as previously described. The post-hydrocyclone flocculant-dosed wastewater stream 41 that results being introduced into the flotation tank 40 of FIGS. 1, 12, and 13, also as previously described.

The wastewater purification system 10 of FIGS. 1, 12, and 13, and methods 100, 109, 110, 111 of FIGS. 2, 7, 9 and 11, respectively, have the following advantages when compared to a traditional wastewater treatment system described in the Background section. First, the wastewater purification system 10 requires a significantly smaller foot print than a conventional wastewater treatment system because it does not require large trickling filters, batch reactors, aeration tanks, treatment ponds, or wastewater lagoons often associated with aerobic biological treatment of wastewater. In addition, the flotation tank 40 of FIGS. 1, 4, 5, 12, and 13 typically is 10% the size of a similar compact DAFs. Second, the wastewater purification system 10 is scalable. The inventors envision that the wastewater purification system 10 can be scaled from a mobile wastewater treatment unit housed on a skid or within a semi tracker-trailer to large municipal wastewater treatment systems. In addition, the system can be modular and include a number of smaller units working in parallel to process a higher throughput. Third, the wastewater purification system 10 is relatively simple and requires much less initial capital outlay compared with a conventional wastewater treatment system. Fourth, the wastewater purification system can reduce greenhouse gases compared with a traditional wastewater treatment system because it does not use carbon dioxide-producing biological processes. Fifth, the sludge produced has not be modified by the biological method and therefore has a higher nutrient level if processed for fertilizer and a higher energy capacity if processed for methane production for energy recapture. Sixth, the system is faster and uses between 20% and 50% less energy to process wastewater than the most efficient biological systems that process a similar amount of wastewater. Seventh, the inventors envision using the wastewater purification system 10 to produce potable water. This can be especially helpful in impoverished and rural communities where drinking water is a scarce resource. An example of a wastewater purification system 10 that may be suitable for producing potable water is illustrated in FIG. 12.

FIGS. 12 and 13 illustrated examples of wastewater purification systems 10 that utilize the principles, structural combination, and processes of FIG. 1. FIG. 12 utilizes a filtration/sterilization stage 80 that produces potable product water 79. FIG. 13 utilizes separation stage 81 to further remove both settleable and agglomerated solids. FIGS. 12 and 13 both share the basic structural combinations and processes of FIG. 1, as previously described. For brevity in the following description of FIGS. 12 and 13, the differences will be highlighted.

Referring to FIG. 12, filtration/sterilization stage 80 can be added to the wastewater purification systems of FIG. 1 or 13 in order to further filter and disinfect the product water 57. FIG. 12 illustrates a filtration/sterilization stage 80 that may be suitable for producing potable water from the product water 57. The filtration/sterilization stage 80, as illustrated, can include a membrane 82 or several of membranes 82 in series or parallel depending on the membrane type. Examples of the membrane 82 include microfiltration, ultrafiltration, nanofiltration, and reverse osmosis membranes. Ultrafiltration membrane systems typically have membranes arranged in parallel while nanofiltration and reverse osmosis systems typically have membranes arranged in series. Ultrafiltration membranes can remove large molecule dissolved solids and remaining suspended solids. Nanofiltration membranes can remove nutrients and other small molecule dissolved solids along with remaining large molecule dissolved solids. An ultrafiltration membrane system followed in series by a nanofiltration membrane system, can filter out both suspended and dissolved solids. A reverse osmosis membrane system can substitute the nanofiltration membrane system to remove dissolved solids. Other filtration systems such as activated carbon filtration or media filtration can be used in combination with or in place of the membrane 82 depending on the application. An ultraviolet (UV) sterilization stage 83 can follow the membrane 82 or between two of the membranes 82, and is used as a primary disinfectant. For example, UV sterilization can be positioned between an ultrafiltration membrane system and a nanofiltration membrane system. This stage uses ultraviolet light to kill pathogens that may remain in the system. A residual disinfectant stage 84 can optionally be used to help ensure that the potable product water 79 remains free from algae, bacteria, and other pathogens. In FIG. 12, the residual disinfectant stage 84 includes a chlorine tank 85 and a continuous-dosing pump 86. Other disinfectants, know to one of ordinary skill in the art, such as chloramine can be substituted for chlorine. In an experimental system similar to FIG. 12, but without a bypass air injector assembly, and feeding the product water 57 from the flotation tank 40 into a membrane 82 comprising ultrafiltration membranes, the inventors were able to produce product water at the output of the membrane 82 with 0 mg/L total suspended solids from raw wastewater with 214 mg/L of total suspended solids. This represents a 100% suspended solids removal rate.

Referring to FIG. 13, mechanical separators can be used to further remove settleable solids, colloidal particles, or lighter-than-water particles, oils, or fats. Examples of mechanical separators include vortex separators, disc separators, and other centrifugal separators. FIG. 13 illustrates the use of a Richter-type separator 87. The output of the product water outlet 58 can feed the product water 57 to the Richter-type separator 87 through a variable speed flow pump 88. An auxiliary output 89 can optionally drain the flotation tank 40 on startup or could be used as a bypass line. Valves 90, 91, such as gate valves, or other fluid diverting valves, can control the flow of the product water 57 to the Richter-type separator or the auxiliary output 89.

The term, Richter-type separator was first used in U.S. Pat. No. 9,487,425 to describe an axial-flow type separator for separating immiscible fluids, or for separating solids in a fluid carrier, having different specific gravities where the fluid pump with the separator employs an impeller having a hollow core for passing fluid from an inlet and a decreasing axial pitch in the direction of fluid flow. U.S. Pat. No. 5,084,189 by inventor Harvey E. Richter exemplifies a Richter-type separator. The Richter-type separator 87 includes a lighter-than-water solids output 87*a*, a heavier-than-water solids output 87*b*, and a separated product water output 87*c*. The lighter-than-water solids output 87*a* and heavier-than-water solids output 87*b* can optionally be combined as described in U.S. Pat. Nos. 9,487,425, 9,512,022, 9,512,023, 9,611,162, and 10,173,910 to inventor Paul L. Culler. This combined stream 92 can optionally be combined with the thickened sludge 62 in a sludge tank 93.

Both FIGS. 12 and 13 illustrate optional elements that could enhance the operation of the wastewater purification system 10 of FIG. 1. Referring to FIGS. 12 and 13, a grinder pump 94 can optionally be positioned early in the process, for example, between the inline air injector assembly 20 and the coagulant injector assembly 14, as illustrated. The grinder pump 94 will grind rags, paper, and other debris to typically less than 0.0064 m (0.021 ft).

FIGS. 12 and 13 both illustrate the thickened sludge 62 being fed to a sludge tank 93 from the exit trough 63 of the flotation tank 40. The thickened sludge 62 can be transferred by a screw conveyor 95, as illustrated. It can be transferred by other structures known in the art for transferring thickened sludge such as conveyors, or suction. If the thickened sludge 62 is sufficiently dewatered, it could be transferred, for example, by truck 96 for disposal in a land fill. If not sufficiently dewatered, the thickened sludge 62 can optionally be dewatered further by a sludge press, or other sludge-dewatering device, and can be sterilized by heat or other methods of sterilizing thickened sludge known in the art. The sludge tank 93 can optionally have liquid output 97 where any residual liquid 98 further removed from the thickened sludge 62 can be optionally returned to the inlet pipe 12. Similarly, the settleable solids 33 removed by the hydrocyclone separator 32 can feed into a settleable solids tank 99, and the settleable solids output stream 115 can optionally feed the sludge tank 93 via a pump 116.

A wastewater purification system 10 of FIGS. 1, 12, and 13, and methods 100, 109, 110, 111 for purifying wastewater in FIGS. 2, 7, 9, and 11 have been described. It is not the intent of this disclosure to limit the claimed invention to the examples, variations, and exemplary embodiments described in the specification. Those skilled in the art will recognize that variations will occur when embodying the claimed invention in specific implementations and environments. For example, in FIGS. 1, 12, and 13, serpentine piping 30 followed the flocculant injection from the pre-hydrocyclone flocculant injector assembly 27. The length of the serpentine piping 30 allowed adequate residence time for the flocculant 26 to mix with the wastewater-coagulant mixture 18. The bends in the serpentine piping 30 created sufficient turbulence to help facilitate mixing of the flocculant 26 with the wastewater-coagulant mixture 18. Other structures that perform an equivalent function and achieve an equivalent result can be substituted for the serpentine piping 30. For example, the flocculant 26 and wastewater-coagulant mixture 18 can be mixed in a mixing chamber that has a preset residence time. One of the advantages of the mixing chamber is that the residence time can be adjusted while the serpentine piping 30 has a fixed residence time depending on the flow rate of the system. One of the advantages of the serpentine piping 30 is that it is passive, simple, and less prone to break than a mixing chamber with moving parts. Therefore, one skilled in the art can choose the appropriate mixing structure based on their needs and priorities.

In FIGS. 12 and 13, the thickened sludge 62 from the exit trough 63 of the flotation tank 40 is fed to a sludge tank 93. This is but one example of how the thickened sludge 62 can be handled. For many applications, the thickened sludge 62 is of adequate thickness for direct disposal. However, in some applications, it may be desirable to further thicken or sterilize the thickened sludge 62. For example, the thickened sludge 62 can be conveyed directly to a sludge-dewatering device such as a belt filter press or screw press. The resulting output would be sludge cakes. The sludge cakes can be further dewatered, if required, by a sludge dryer such as a belt dryer.

The Richter-type separator 87 of FIG. 13 is illustrated as a three-output Richter-type separator with the lighter-than-water solids output 87*a* and the heavier-than-water solids output 87*b* tied together. The Richter-type separator 87 can optionally have two outputs, for example, a heavier-than-water solids output 87*b* and the separated product water output 87*c*. As discussed for FIG. 13, other centrifugal separators or disc separators can optionally be used in place of or in addition to the Richter-type separator 87.

It is possible to implement the wastewater purification system 10 of FIGS. 1, 12, and 13 without the pre-hydrocyclone flocculant injector assembly 27. For example, the wastewater purification system 10 would include the post-hydrocyclone flocculant injector assembly 37. Air could be injected into the system either by one or more of the bypass air injector assemblies 66, 67, 68 of FIGS. 6, 8, and 10 respectively, either alone or in combination with the inline air injector assembly 20. Similarly, the inline air injector assembly 20 can inject the air alone. With the pre-hydrocyclone flocculant injector assembly 27 absent, the inline air injector assembly 20 can be positioned anywhere between the coagulant injector assembly 14 and the hydrocyclone separator 32.

It is possible to implement certain features described in separate embodiments in combination within a single embodiment. Similarly, it is possible to implement certain features described in single embodiments either separately or in combination in multiple embodiments. For example, the filtration/sterilization stage 80 of FIG. 12 can be added to FIG. 13. As another example, the separated product water 117 from the separated product water output 87*c* can feed the membrane 82. This configuration can be helpful when it is not possible to remove sufficient settleable and colloidal solids from the product water 57 to feed the membrane 82 without damaging or clogging it. In addition, the filtration/sterilization stage 80 can be added to FIG. 1 without the other optional features, such as the sludge tank 93, grinder pump 94, or settleable solids tank 99 of FIG. 12. Similarly, the separation stage 81 of FIG. 13 can be added to FIG. 1 without other optional features. Likewise, one or more combinations of optional features discussed for FIG. 12 or 13 can be added to FIG. 1 without the separation stage 81 of FIG. 13 or the filtration/sterilization stage 80 of FIG. 12. The inventor envisions that these variations fall within the scope of the claimed invention.

FIG. 12 illustrates the bypass air injector assembly 66 of FIG. 6 and FIG. 13 illustrates the bypass air injector assembly 67 of FIG. 8 as example implementations. The wastewater purification system 10 of FIG. 12 is not limited to the bypass air injector assembly 66. Likewise, the wastewater purification system 10 of FIG. 13 is not limited to the bypass air injector assembly 67. The wastewater purification system 10 of FIGS. 12 and 13, can use no bypass air injector assembly, as illustrated in FIG. 1. Alternatively, it can use any of the bypass air injector assembly 66 of FIG. 6, the bypass air injector assembly 67 of FIG. 8, or the bypass air injector assembly 68 of FIG. 10. In addition, the wastewater purification system 10 can use one or more of the bypass air injector assemblies 66, 67, 68 without the inline air injector assembly 20 of FIGS. 1, 12, and 13. For example, the configurations illustrated in FIGS. 6 and 8 can be used without the pre-hydrocyclone flocculant injector assembly 27 or the inline air injector assembly 20. Note that while the bypass air injector assemblies 66, 67, 68 uses a Venturi air injector, they can also use other air injector assemblies that can perform an equivalent function while maintaining the integrity of the micro-floc or macro-floc.

"Optional" or "optionally" is used throughout this disclosure to describe features or structures that are optional. Not using the word optional or optionally to describe a feature or structure does not imply that the feature or structure is essential, necessary, or not optional. Describing an advantage of an embodiment, example, or feature of the wastewater purification system does not imply that the implementation or example is essential or required. However, when discussing advantages of the wastewater purification system over the prior art, part of the purpose of this is to distinguish the wastewater purification system from the prior art and to demonstrate part of the inventors' contribution to the art.

Using the word "or," as used in this disclosure is to be interpreted as the ordinary meaning of the word "or" (i.e., an inclusive or) For example, the phrase "A or B" can mean any of the following: A, B, A with B. For example, if one were to say, "I will wear a waterproof jacket if it snows or rains," the meaning is that the person saying the phrase intends to wear a waterproof jacket if it rains alone, if it snows alone, if it rains and snows in combination.

While the examples, exemplary embodiments, and variations are helpful to those skilled in the art in understanding the claimed invention, it should be understood that the scope of the claimed invention is defined solely by the following claims and their equivalents.

The following are additional examples of a wastewater purification system 10 of FIGS. 1, 12, and 13 and methods 100, 109, 110, 111 of FIGS. 2, 7, 9, and 11, respectively.

Example 1: A wastewater purification system for separating and purifying a wastewater stream, comprising: a hydrocyclone separator that is fed by the wastewater stream; a flotation tank disposed to separate product water from a thickened sludge; a piping feeding the flotation tank from the hydrocyclone separator, the piping including a vortex produced by the hydrocyclone separator; and a post-hydrocyclone flocculant injector assembly positioned to inject flocculant into the vortex.

Example 2: The wastewater purification system of Example 1, further comprising: a coagulant injector assembly disposed to inject coagulant into the wastewater stream before the hydrocyclone separator.

Example 3: The wastewater purification system of Example 1, further comprising: a bypass air injector assembly that includes a bypass Venturi air injector; the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and the bypass air-injected stream is reintroduced into the post-hydrocyclone flocculant-dosed wastewater stream downstream from the diverted portion.

Example 4: The wastewater purification system of Example 3, further comprising: an expansion pipe rising upward within the flotation tank, the expansion pipe including an expansion pipe outlet terminating proximate to a waterline within the flotation tank; the expansion pipe sized, shaped, and disposed to receive, slow velocity, and reduce turbulence from the post-hydrocyclone flocculant-dosed wastewater stream; and a planar surface positioned over the expansion pipe outlet and disposed to cause the post-hydrocyclone flocculant-dosed wastewater stream to deflect downward away from the waterline.

Example 5: The wastewater purification system of Example 1, further comprising: a bypass air injector assembly that includes a bypass Venturi air injector; the bypass Venturi air injector receives and injects air into a diverted portion of the wastewater stream from before the hydrocyclone separator creating an bypass air-injected stream; and the bypass air-injected stream is injected into a post-hydrocyclone flocculant-dosed wastewater stream, the post-hydrocyclone flocculant-dosed wastewater stream resulting from injecting flocculant into the vortex.

Example 6: The wastewater purification system of Example 5, further comprising: an expansion pipe rising upward within the flotation tank, the expansion pipe including an expansion pipe outlet terminating proximate to a waterline within the flotation tank; the expansion pipe sized, shaped, and disposed to receive, slow velocity, and reduce turbulence from the post-hydrocyclone flocculant-dosed wastewater stream; and a planar surface positioned over the expansion pipe outlet and disposed to cause the post-hydrocyclone flocculant-dosed wastewater stream to deflect downward away from the waterline.

Example 7: The wastewater purification system of Example 1, further comprising: an inline air injector assembly that include an inline Venturi air injector; and the inline Venturi air injector disposed to inject air into the wastewater stream before the hydrocyclone separator.

Example 8: The wastewater purification system of Example 7, further comprising: a bypass air injector assembly that includes a bypass Venturi air injector; the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and the bypass air-injected stream is injected into the post-hydrocyclone flocculant-dosed wastewater stream downstream from the diverted portion.

Example 9: The wastewater purification system of Example 1, further comprising: an expansion pipe rising upward within the flotation tank, the expansion pipe including an expansion pipe outlet terminating proximate to a waterline within the flotation tank; the expansion pipe sized, shaped, and disposed to receive, slow velocity, and reduce turbulence from a post-hydrocyclone flocculant-dosed wastewater stream, the post-hydrocyclone flocculant-dosed wastewater stream resulting from injecting flocculant into the vortex; and a planar surface positioned over the expansion pipe outlet and disposed to cause the post-hydrocyclone flocculant-dosed wastewater stream to deflect downward away from the waterline.

Example 10: The wastewater purification system of Example 1, further comprising: a pre-hydrocyclone flocculant injector assembly disposed to inject flocculant into the wastewater stream before the hydrocyclone separator, creating a micro-floc wastewater mixture.

Example 11: The wastewater purification system of Example 10, further comprising: a coagulant injector assembly disposed to inject coagulant into the wastewater stream before the pre-hydrocyclone flocculant injector assembly.

Example 12: The wastewater purification system of Example 10, further comprising: an expansion pipe rising upward within the flotation tank, the expansion pipe including an expansion pipe outlet terminating proximate to a waterline within the flotation tank; the expansion pipe sized, shaped, and disposed to receive, slow velocity, and reduce turbulence from a post-hydrocyclone flocculant-dosed wastewater stream, the post-hydrocyclone flocculant-dosed wastewater stream resulting from injecting flocculant into the vortex; and a planar surface positioned over the expansion pipe outlet and disposed to cause the post-hydrocyclone flocculant-dosed wastewater stream to deflect downward away from the waterline.

Example 13: The wastewater purification system of Example 12, further comprising: a bypass air injector assembly that includes a bypass Venturi air injector; the bypass Venturi air injector receives and injects air into a diverted portion of the post-hydrocyclone flocculant-dosed wastewater stream after the vortex has dissipated creating an bypass air-injected stream; and the bypass air-injected stream is injected into the post-hydrocyclone flocculant-dosed wastewater stream downstream from the diverted portion.

Example 14: The wastewater purification system of Example 12, further comprising: a bypass air injector assembly that includes a bypass Venturi air injector; the bypass Venturi air injector receives and injects air into a diverted portion of the micro-floc wastewater mixture creating a bypass air-injected stream; and the bypass air-injected stream is injected into the post-hydrocyclone flocculant-dosed wastewater stream.

Example 15: The wastewater purification system of Example 10, further comprising: an inline air injector assembly that include an inline Venturi air injector; and the inline Venturi air injector disposed to inject air into the wastewater stream before the hydrocyclone separator.

Example 16: The wastewater purification system of Example 15, further comprising: a bypass air injector assembly that includes a bypass Venturi air injector; the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and the bypass air-injected stream is injected into the post-hydrocyclone flocculant-dosed wastewater stream downstream from the diverted portion.

Example 17: The wastewater purification system of Example 15, further comprising: a bypass air injector assembly that includes a bypass Venturi air injector; the bypass Venturi air injector receives and injects air into a diverted portion of the micro-floc wastewater mixture creating an bypass air-injected stream; and the bypass air-injected stream is injected into a post-hydrocyclone flocculant-dosed wastewater stream, the post-hydrocyclone flocculant-dosed wastewater stream resulting from injecting flocculant into the vortex.

Example 18: The wastewater purification system of Example 10, further comprising: a bypass air injector assembly that includes a bypass Venturi air injector; the bypass Venturi air injector receives and injects air into a diverted portion of the micro-floc wastewater mixture creating a bypass air-injected stream; and the bypass air-injected stream is injected into the micro-floc wastewater mixture downstream before the hydrocyclone separator.

Example 19: The wastewater purification system of Example 10, further comprising: a bypass air injector assembly that includes a bypass Venturi air injector; the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and the bypass air-injected stream is injected into the post-hydrocyclone flocculant-dosed wastewater stream downstream from the diverted portion.

Example 20: The wastewater purification system of Example 10, further comprising: a bypass air injector assembly that includes a bypass Venturi air injector; the bypass Venturi air injector receives and injects air into a diverted portion of the micro-floc wastewater mixture creating an bypass air-injected stream; and the bypass air-injected stream is injected into a post-hydrocyclone flocculant-dosed wastewater stream, the post-hydrocyclone flocculant-dosed wastewater stream resulting from injecting flocculant into the vortex.

Example 21: The wastewater purification system of Examples 3, 4, 5, 6, 7, 8, 9, 11, 12, 13, 14, 15, 16, 17, 18, 19, or 20, further comprising: a coagulant injector assembly disposed to inject coagulant into the wastewater stream before the hydrocyclone separator.

Example 22: The wastewater purification system of Examples 7, 10, 15, or 18, further comprising: an expansion pipe rising upward within the flotation tank, the expansion pipe including an expansion pipe outlet terminating proximate to a waterline within the flotation tank; the expansion pipe sized, shaped, and disposed to receive, slow velocity, and reduce turbulence from a post-hydrocyclone flocculant-dosed wastewater stream, the post-hydrocyclone flocculant-dosed wastewater stream resulting from injecting flocculant into the vortex; and a planar surface positioned over the expansion pipe outlet and disposed to cause the post-hydrocyclone flocculant-dosed wastewater stream to deflect downward away from the waterline.

Example 23: The wastewater purification system of Examples 8, 16, 17, 19, or 20, further comprising: an expansion pipe rising upward within the flotation tank, the expansion pipe including an expansion pipe outlet terminating proximate to a waterline within the flotation tank; the expansion pipe sized, shaped, and disposed to receive, slow velocity, and reduce turbulence from the post-hydrocyclone flocculant-dosed wastewater stream; and a planar surface positioned over the expansion pipe outlet and disposed to cause the post-hydrocyclone flocculant-dosed wastewater stream to deflect downward away from the waterline.

Example 24: A method for purifying wastewater from a wastewater stream, comprising: injecting flocculant into a vortex produced by a hydrocyclone separator and within a piping feeding a flotation tank from the hydrocyclone separator.

Example 25: The method of Example 24, further comprising: injecting air using a bypass Venturi air injector into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and injecting the bypass air-injected stream into the post-hydrocyclone flocculant-dosed wastewater stream downstream from the diverted portion.

Example 26: The method of Example 24, further comprising: injecting air using a bypass Venturi air injector into a diverted portion of the wastewater stream from before the hydrocyclone separator creating an bypass air-injected stream; and injecting the bypass air-injected stream into a post-hydrocyclone flocculant-dosed wastewater stream resulting from injecting flocculant into the vortex.

Example 27: The method of Examples 24, 25, or 26, further comprising: slowing the velocity, and reducing turbulence from the post-hydrocyclone flocculant-dosed wastewater stream; and deflecting the post-hydrocyclone flocculant-dosed wastewater stream to deflect downward away from a waterline within the flotation tank.

Example 28: The method of Examples 24, 25, 26, or 27 further comprising: injecting coagulant into a wastewater stream feeding the hydrocyclone separator.

Example 29: The method of Examples 24, 25, 26, 27, or 28, further comprising: injecting air inline into the wastewater stream before the hydrocyclone separator using an inline Venturi air injector.

Example 30: The method of Example 24, 25, 26, 27, 28, or 29, further comprising: injecting flocculant into the wastewater stream before the hydrocyclone separator.

Example 31: The method of Example 30, further comprising: injecting air using a bypass Venturi air injector into a diverted portion of the wastewater stream from before the hydrocyclone separator creating a bypass air-injected stream; and injecting the bypass air-injected stream downstream before the hydrocyclone separator.

What is claimed is:

1. A wastewater purification system for separating and purifying a wastewater stream, comprising:
   a hydrocyclone separator that is fed by the wastewater stream, the hydrocyclone separator includes a bottom outlet for removing settleable solids and a top outlet for receiving a vortex formed within the hydrocyclone separator;
   a flotation tank disposed to separate a product water from a thickened sludge;
   a piping feeding the flotation tank from the top outlet of the hydrocyclone separator, the piping including the vortex produced by the hydrocyclone separator;
   a source of flocculant connected to a post-hydrocylcone flocculant injector assembly; and
   the post-hydrocyclone flocculant injector assembly is positioned to inject the flocculant from the flocculant source into the piping containing the vortex.

2. The wastewater purification system of claim 1, further comprising:
   a coagulant injector assembly disposed to inject coagulant into the wastewater stream before the hydrocyclone separator.

3. The wastewater purification system of claim 1, further comprising:
   a bypass air injector assembly that includes a bypass Venturi air injector;
   the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and
   the bypass air-injected stream is injected into the post-hydrocyclone flocculant-dosed wastewater stream downstream from the diverted portion.

4. The wastewater purification system of claim 3, further comprising:
   an expansion pipe rising upward within the flotation tank, the expansion pipe including an expansion pipe outlet terminating proximate to a waterline within the flotation tank; the expansion pipe sized, shaped, and disposed to receive, slow velocity, and reduce turbulence from the post-hydrocyclone flocculant-dosed wastewater stream; and
   a planar surface positioned over the expansion pipe outlet and disposed to cause the post-hydrocyclone flocculant-dosed wastewater stream to deflect downward away from the waterline.

5. The wastewater purification system of claim 1, further comprising:
   a bypass air injector assembly that includes a bypass Venturi air injector;
   the bypass Venturi air injector receives and injects air into a diverted portion of the wastewater stream from before the hydrocyclone separator creating an bypass air-injected stream; and the bypass air-injected stream is injected into a post-hydrocyclone flocculant-dosed wastewater stream, the post-hydrocyclone flocculant-dosed wastewater stream resulting from injecting flocculant into the vortex.

6. The wastewater purification system of claim 5, further comprising:
   an expansion pipe rising upward within the flotation tank, the expansion pipe including an expansion pipe outlet terminating proximate to a waterline within the flotation tank;
   the expansion pipe sized, shaped, and disposed to receive, slow velocity, and reduce turbulence from the post-hydrocyclone flocculant-dosed wastewater stream; and
   a planar surface positioned over the expansion pipe outlet and disposed to cause the post-hydrocyclone flocculant-dosed wastewater stream to deflect downward away from the waterline.

7. The wastewater purification system of claim 1, further comprising:
   an inline air injector assembly that include an inline Venturi air injector; and
   the inline Venturi air injector disposed to inject air into the wastewater stream before the hydrocyclone separator.

8. The wastewater purification system of claim 7, further comprising:
   a bypass air injector assembly that includes a bypass Venturi air injector;
   the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and
   the bypass air-injected stream is injected into the post-hydrocyclone flocculant-dosed wastewater stream downstream from the diverted portion.

9. The wastewater purification system of claim 1, further comprising:
   an expansion pipe rising upward within the flotation tank, the expansion pipe including an expansion pipe outlet terminating proximate to a waterline within the flotation tank;
   the expansion pipe sized, shaped, and disposed to receive, slow velocity, and reduce turbulence from a post-hydrocyclone flocculant-dosed wastewater stream, the post-hydrocyclone flocculant-dosed wastewater stream resulting from injecting flocculant into the vortex; and
a planar surface positioned over the expansion pipe outlet and disposed to cause the post-hydrocyclone flocculant-dosed wastewater stream to deflect downward away from the waterline.

10. The wastewater purification system of claim 1, further comprising:
a pre-hydrocyclone flocculant injector assembly disposed to inject flocculant into the wastewater stream before the hydrocyclone separator, creating a micro-floc wastewater mixture.

11. The wastewater purification system of claim 10, further comprising:
a coagulant injector assembly disposed to inject coagulant into the wastewater stream before the pre-hydrocyclone flocculant injector assembly.

12. The wastewater purification system of claim 10, further comprising:
an expansion pipe rising upward within the flotation tank, the expansion pipe including an expansion pipe outlet terminating proximate to a waterline within the flotation tank;
the expansion pipe sized, shaped, and disposed to receive, slow velocity, and reduce turbulence from a post-hydrocyclone flocculant-dosed wastewater stream, the post-hydrocyclone flocculant-dosed wastewater stream resulting from injecting flocculant into the vortex; and
a planar surface positioned over the expansion pipe outlet and disposed to cause the post-hydrocyclone flocculant-dosed wastewater stream to deflect downward away from the waterline.

13. The wastewater purification system of claim 12, further comprising:
a bypass air injector assembly that includes a bypass Venturi air injector;
the bypass Venturi air injector receives and injects air into a diverted portion of the post-hydrocyclone flocculant-dosed wastewater stream after the vortex has dissipated creating an bypass air-injected stream; and
the bypass air-injected stream is injected into the post-hydrocyclone flocculant-dosed wastewater stream downstream from the diverted portion.

14. The wastewater purification system of claim 12, further comprising:
a bypass air injector assembly that includes a bypass Venturi air injector;
the bypass Venturi air injector receives and injects air into a diverted portion of the micro-floc wastewater mixture creating a bypass air-injected stream; and
the bypass air-injected stream is injected into the post-hydrocyclone flocculant-dosed wastewater stream.

15. The wastewater purification system of claim 10, further comprising:
an inline air injector assembly that include an inline Venturi air injector; and
the inline Venturi air injector disposed to inject air into the wastewater stream before the hydrocyclone separator.

16. The wastewater purification system of claim 15, further comprising:
a bypass air injector assembly that includes a bypass Venturi air injector;
the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and
the bypass air-injected stream is injected into the post-hydrocyclone flocculant-dosed wastewater stream downstream from the diverted portion.

17. The wastewater purification system of claim 15, further comprising:
a bypass air injector assembly that includes a bypass Venturi air injector;
the bypass Venturi air injector receives and injects air into a diverted portion of the micro-floc wastewater mixture creating an bypass air-injected stream; and
the bypass air-injected stream is injected into a post-hydrocyclone flocculant-dosed wastewater stream, the post-hydrocyclone flocculant-dosed wastewater stream resulting from injecting flocculant into the vortex.

18. The wastewater purification system of claim 10, further comprising:
a bypass air injector assembly that includes a bypass Venturi air injector;
the bypass Venturi air injector receives and injects air into a diverted portion of the micro-floc wastewater mixture creating an bypass air-injected stream; and
the bypass air-injected stream is injected into the micro-floc wastewater mixture downstream before the hydrocyclone separator.

19. The wastewater purification system of claim 10, further comprising:
a bypass air injector assembly that includes a bypass Venturi air injector;
the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and
the bypass air-injected stream is injected into the post-hydrocyclone flocculant-dosed wastewater stream downstream from the diverted portion.

20. The wastewater purification system of claim 10, further comprising:
a bypass air injector assembly that includes a bypass Venturi air injector;
the bypass Venturi air injector receives and injects air into a diverted portion of the micro-floc wastewater mixture creating a bypass air-injected stream; and
the bypass air-injected stream is injected into a post-hydrocyclone flocculant-dosed wastewater stream, the post-hydrocyclone flocculant-dosed wastewater stream resulting from injecting flocculant into the vortex.

21. A wastewater purification system for separating and purifying a wastewater stream, comprising:
a hydrocyclone separator that is fed by the wastewater stream;
a flotation tank disposed to separate a product water from a thickened sludge;
a piping feeding the flotation tank from the hydrocyclone separator, the piping including a vortex produced by the hydrocyclone separator; and
a post-hydrocyclone flocculant injector assembly positioned to inject flocculant into the piping containing the vortex;
a bypass air injector assembly that includes a bypass Venturi air injector;
the bypass Venturi air injector receives and injects air into a diverted portion of a post-hydrocyclone flocculant-dosed wastewater stream after the vortex has dissipated creating an bypass air-injected stream, the post-hydrocyclone flocculant-dosed wastewater stream resulting from injecting flocculant into the vortex; and the bypass air-injected stream is injected into the post-hydrocyclone flocculant-dosed wastewater stream downstream from the diverted portion.

22. The wastewater purification system of claim 21, further comprising:

an expansion pipe rising upward within the flotation tank, the expansion pipe including an expansion pipe outlet terminating proximate to a waterline within the flotation tank; the expansion pipe sized, shaped, and disposed to receive, slow velocity, and reduce turbulence from the post-hydrocyclone flocculant-dosed wastewater stream; and a planar surface positioned over the expansion pipe outlet and disposed to cause the post-hydrocyclone flocculant-dosed wastewater stream to deflect downward away from the waterline.

* * * * *

UNITED STATES PATENT AND TRADEMARK OFFICE
CERTIFICATE OF CORRECTION

PATENT NO. : 11,008,227 B2  
APPLICATION NO. : 16/524179  
DATED : May 18, 2021  
INVENTOR(S) : Worley et al.

Page 1 of 2

It is certified that error appears in the above-identified patent and that said Letters Patent is hereby corrected as shown below:

On the Title Page

In FOREIGN PATENT DOCUMENTS:

Page 2, Column 1, Line 57, "EP 972428 A 7/1963" should read --GB 972428 A 7/1963--

In OTHER PUBLICATIONS:

Page 2, Column 2, Lines 13–14, "Nonwoo Kim, Minsoo Maeng, Gyunam Myung, Haegyun Lee, and Seok Dockko" should read --Wonwoo Kim, Minsoo Maeng, Gyunam Myung, Haegyun Lee, and Seok Dockko--

Page 3, Column 2, Lines 1–3, "Aerofloat Dissolved Air Flotation, downloaded from the Internet from: http://www.aerofloat.com.au/dissolved-air-flotation-21 on Dec. 23, 2018." should read --Aerofloat Dissolved Air Flotation, downloaded from the Internet from: http://www.aerofloat.com.au/dissolved-air-flotation-2/ on Dec. 23, 2018.--

Page 3, Column 2, Lines 22–23, "PLC-SeriesDAF System, FRC Systems International LLC, Dec. 2018, Santa Ana, California." should read --PCL-Series DAF System, FRC Systems International LLC, Dec. 2018, Santa Ana, California.--

In the Claims

Column 21, Line 45, Claim 1, "a source of flocculant connected to a post-hydrocylcone" should read --a source of flocculant connected to a post-hydrocyclone--

Column 24, Line 23, Claim 18, "creating an bypass air-injected stream; and" should read --creating a bypass air-injected stream; and--

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*

Column 24, Line 59, Claim 20, "hydrocyclone separator; and" should read --hydrocyclone separator;--